(12) United States Patent
Furukawa et al.

(10) Patent No.: US 12,497,519 B2
(45) Date of Patent: *Dec. 16, 2025

(54) PRE-COATED PLATED STEEL SHEET AND MOLDED PRODUCT

(71) Applicant: NIPPON STEEL CORPORATION, Tokyo (JP)

(72) Inventors: Hiroyasu Furukawa, Tokyo (JP); Takashi Fujii, Tokyo (JP); Fumio Shibao, Tokyo (JP); Kohei Ueda, Tokyo (JP); Akira Nakagawa, Tokyo (JP); Yuki Yamamura, Tokyo (JP); Naoto Sasaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/281,933

(22) PCT Filed: Mar. 23, 2022

(86) PCT No.: PCT/JP2022/013683
§ 371 (c)(1),
(2) Date: Sep. 13, 2023

(87) PCT Pub. No.: WO2022/210200
PCT Pub. Date: Oct. 6, 2022

(65) Prior Publication Data
US 2024/0150585 A1    May 9, 2024

(30) Foreign Application Priority Data

Mar. 31, 2021    (JP) .................. 2021-059594

(51) Int. Cl.
*B05D 7/14*    (2006.01)
*B05D 7/16*    (2006.01)
(Continued)

(52) U.S. Cl.
CPC ................ *C09D 5/08* (2013.01); *B05D 7/16* (2013.01); *C09D 5/002* (2013.01); *C09D 175/06* (2013.01); *C23C 2/06* (2013.01); *C23C 2/40* (2013.01)

(58) Field of Classification Search
CPC .............................. C09D 5/002; B05D 3/102
See application file for complete search history.

(56) References Cited

U.S. PATENT DOCUMENTS

| 6,361,872 B1 | 3/2002 | Hosono et al. |
| 2019/0270894 A1 | 9/2019 | Jo et al. |
| 2020/0002800 A1 | 1/2020 | Kim et al. |

FOREIGN PATENT DOCUMENTS

| EP | 2 692 900 A2 | 2/2014 | |
| EP | 2990505 A1 * | 3/2016 | ............... B05D 1/40 |

(Continued)

*Primary Examiner* — Adam Krupicka
(74) *Attorney, Agent, or Firm* — Birch, Stewart, Kolasch & Birch, LLP

(57) ABSTRACT

To further improve, even under OT bending with the use of a Zn—Al—Mg-based alloy plated steel sheet as a base sheet, corrosion resistance regarding corrosion under paint film at a OT bent portion and a periphery thereof, without causing occurrence of cracks and peeling in the paint film. A pre-coated plated steel sheet according to the present invention includes: a plating layer composed of Zn—Al—Mg-based alloy plating, the plating layer being positioned on one side or both sides of a steel sheet; a chemical treatment film layer positioned on the plating layer; and a paint film layer positioned on the chemical treatment film, in which the paint film layer includes a primer paint film layer, and an upper paint film layer positioned on the primer paint film layer, and at least any of the following is satisfied: both a condition (a-1) and a condition (a-2); a condition (b); and a condition (c).

13 Claims, 4 Drawing Sheets

(51) Int. Cl.
*C09D 5/00* (2006.01)
*C09D 5/08* (2006.01)
*C09D 175/06* (2006.01)
C23C 2/06 (2006.01)
C23C 2/40 (2006.01)

(56) References Cited

FOREIGN PATENT DOCUMENTS

| | | |
|---|---|---|
| EP | 3 075 879 A1 | 10/2016 |
| EP | 3 633 062 A1 | 4/2020 |
| JP | 63-97267 A | 4/1988 |
| JP | 9-193286 A | 7/1997 |
| JP | 2001-323389 A | 11/2001 |
| JP | 2003-103697 A | 4/2003 |
| JP | 2005-52997 A | 3/2005 |
| JP | 2005-82623 A | 3/2005 |
| JP | 2007-44922 A | 2/2007 |
| JP | WO 2008-12734 A | 1/2008 |
| KR | 10-2015-0051840 A | 5/2015 |
| WO | WO 2012/001981 A1 | 1/2012 |
| WO | WO 2012/039217 A1 | 3/2012 |
| WO | WO 2016/174746 A1 | 11/2016 |
| WO | WO 2018/062515 A1 | 4/2018 |
| WO | WO 2019/221193 A1 | 11/2019 |
| WO | WO 2020/100286 A1 | 5/2020 |

* cited by examiner

PRE-COATED PLATED STEEL SHEET AND MOLDED PRODUCT

TECHNICAL FIELD

The present invention relates to a pre-coated plated steel sheet and a molded product.

BACKGROUND ART

For the use of home electric appliances, building materials, and automobiles, a pre-coated plated steel sheet becomes to be used in place of a conventional post-painted product obtained by performing painting after molding. This pre-coated plated steel sheet is one obtained by coating a plated steel sheet after being subjected to rust prevention treatment with a colored organic film, and has a characteristic that it has sufficient workability and good corrosion resistance while exhibiting a beautiful appearance.

The pre-coated plated steel sheet is often used for applications of air conditioner outdoor units and the like, of which quite severe workability in deep drawing, bending of elongated portion, or the like is required. Accordingly, many techniques have been conventionally studied as a method for improving such workability.

For example, Patent Document 1 below discloses a technique in which, on a chemical treatment layer, a layer made of an amino-based and/or mercapto-based silane coupling agent is provided, and on the layer, a primer layer made by mixing (A) a linear high molecular weight polyester resin having a number average molecular weight of 5000 or more and (B) an epoxy resin having an epoxy equivalent of 2500 or less, a hydroxyl content of 3% or more, and a number average molecular weight of 800 or more in a weight ratio of (A)/(B)=50/50 to 95/5, and further making one or two or more of (C) a melamine-based resin, a urea-based resin, a blocked isocyanate resin, and a phenolic resin to be contained in a weight ratio of (A)+(B)/(C)=60/40/to 95/5, thereby securing workability and corrosion resistance at worked portion.

Further, Patent Document 2 below discloses a painted metal sheet obtained by successively providing a lower paint film, an intermediate paint film, and an upper paint film on a surface of a metal sheet, in which the intermediate paint film is formed by forming a polyester-based paint containing: a polyester resin having a number average molecular weight of 5000 to 15000 and a glass transition temperature of −5 to 50° C.; and a fibrous filler of 5 to 50% by weight, into a film by curing, and a ratio of elastic strain energy accumulated in the intermediate paint film to mechanical energy applied to the intermediate paint film, in a case where a tensile stress is applied to the intermediate paint film itself until an elongation percentage becomes 50%, is set to 20% or less.

Further, Patent Document 3 below discloses a painted steel sheet including: a steel sheet; a chemical treatment film formed on a surface of the steel sheet; a primer paint film formed on a surface of the chemical treatment film; and a top paint film formed on a surface of the primer paint film, in which the chemical treatment film contains a fluoride of titanium or a fluoride of zirconium, an oxide of titanium or a hydroxide of titanium, and an oxide of zirconium or a hydroxide of zirconium, and the primer paint film contains an organic resin, a pigment A composed of one or two compounds selected from a group consisting of magnesium phosphate and zirconium phosphate, and a pigment B composed of barium sulfate, in which a content of the pigment A and a content of the pigment B in the primer paint film are respectively 20 to 100 parts by mass with respect to 100 parts by mass of the organic resin, and the total content of the pigment A and the pigment B in the primer paint film is 40 to 160 parts by mass with respect to 100 parts by mass of the organic resin.

Further, Patent Document 4 below discloses an aqueous primer composition containing a carbonyl group-containing modified epoxy resin (A), a cross-linking agent (B), and a rust preventive pigment (C), the carbonyl group-containing modified epoxy resin (A) being produced by reacting an amine compound (a1) having a carbonyl group and at least one active hydrogen bonded to a nitrogen atom per molecule, and an epoxy resin (a2) having two or more epoxy groups per molecule, and a painted article obtained by providing such an aqueous primer composition on a metal material.

Further, Patent Document 5 below discloses a pre-coated metal sheet including: a metal sheet; a base paint film layer provided on the metal sheet, and containing no chromate; a primer paint film layer provided on the base paint film layer, and containing no chromate; and a top paint film layer provided on the primer paint film layer, in which a fracture critical elongation rate of a paint film layer, which is a combination of the primer paint film layer and the top paint film layer, is 10% or more and 25% or less, a glass transition point temperature of the primer paint film layer is greater than 50° C. and 100° C. or less, the top paint film layer contains a resin component that contains an acrylic resin or a polyester modified acrylic resin, and when the pre-coated metal sheet is subjected to 2T close-contact bending, cracks of 5 or more and 30 or less in total with a width of 0.1 mm or less occur in the top paint film, in a range centered on the vertex portion of the bending and having a length of 1 mm in a direction perpendicular to the bending direction.

Further, Patent Document 6 below discloses a pre-coated steel sheet including: a steel sheet; a zinc alloy plating layer provided on the steel sheet and containing Al of 1 to 25 mass %, Mg of 0.1 to 13 mass %, Si of 0 to 2.0 mass %, and the balance being composed of Zn and impurities; and a color film layer provided on the zinc alloy plating layer, and containing at least one of a phosphoric acid compound and a vanadium compound, a color pigment, and a binder resin. Here, it is disclosed that when the color film layer contains the phosphoric acid compound, a concentration of the phosphoric acid compound is 0.3 to 5.0 mass % in terms of P amount with respect to the total solid content mass of the color film layer, and when a cross section in a thickness direction of the color film layer is subjected to mapping observation by FE-EPMA, there exist, within a range of 2 μm in the thickness direction and 200 μm in a direction parallel to an interface between the color film layer and the zinc alloy plating layer, 1 to 15 first regions having a phosphorus element concentration of 3% or more. Further, it is disclosed that when the color film layer contains the vanadium compound, the vanadium compound is a vanadic acid compound or a vanadium oxide, a concentration of the vanadium compound is 0.5 to 8.0 mass % in terms of V amount with respect to the total solid content mass of the color film layer, and when a cross section in the thickness direction of the color film layer is subjected to mapping observation by FE-EPMA, there exist, within a range of 1 μm in the thickness direction from an interface toward a surface side and 200 μm in a direction parallel to the interface, 1 to 10 second regions having a vanadium element concentration of 3% or more.

PRIOR ART DOCUMENT

Patent Document

Patent Document 1: Japanese Laid-open Patent Publication No. 63-97267
Patent Document 2: Japanese Laid-open Patent Publication No. 2008-12734
Patent Document 3: International Publication Pamphlet No. WO 2012/001981
Patent Document 4: International Publication Pamphlet No. WO 2012/039217
Patent Document 5: International Publication Pamphlet No. WO 2016/174746
Patent Document 6: International Publication Pamphlet No. WO 2020/100286

DISCLOSURE OF THE INVENTION

Problems to be Solved by the Invention

In recent years, a pre-coated plated steel sheet is often used for the application designed for a heavy salt damage area, and is required to have a corrosion resistance greater than that of a conventional pre-coated plated steel sheet. When a hot-dip galvanized steel sheet (GI) or an electrogalvanized steel sheet (EG) is used as a base sheet of the pre-coated plated steel sheet, like the way it used to be, a sufficient corrosion resistance performance cannot be satisfied, so that a Zn—Al—Mg-based alloy plated steel sheet excellent in corrosion resistance becomes to be used as the base sheet.

Here, the Zn—Al—Mg-based alloy plating is hard and a plating configuration is non-uniform, when compared to conventional zinc plating such as GI and EG. Accordingly, when a plated steel sheet is elongated, cracks occur locally in the plating, and there arise various problems according to such cracks.

For example, when T bending being one example of elongation, is performed, many fine cracks occur in plating as well as a resin paint film of an upper layer, which becomes a cause of lowering the corrosion resistance. In a case of the pre-coated plated steel sheet using the conventional galvanized steel sheet such as GI or EG as the base sheet, an elongation percentage of the paint film when performing nT bending (n=0, 1, 2, . . . ) is set to 1/(1+n). In a case of 0T bending, for example, it can be estimated that the paint film elongates at 1/(1+0)=1, namely, it elongates to 100%. In this case, if the paint film has extensibility of 100% or more, no cracks occur in the paint film. This is because the plating and the paint film are elongated almost equally. However, when the base sheet is a Zn—Al—Mg-based alloy plated steel sheet, cracks occur locally in the plating due to the T bending as described above, and extremely large deformation is applied locally to the paint film positioned as an upper layer of the plating, so that in the paint film whose extensibility is the same as that of GI, EG, and the like, the number of cracks in the paint film is greatly increased. It seems that a paint film excellent in extensibility is only required to be selected for preventing cracks from occurring in the paint film during the T bending, but generally, in the paint film excellent in extensibility, a stress due to elasticity during working is large. Accordingly, there arise problems such that paint film peeling (a phenomenon so-called "blooming") from a T bent portion proceeds with time in actual usage or by heating, and further, corrosion under paint film (blister under paint film) that reaches a plane portion from the T bent portion proceeds in the actual usage at a salt damage area.

It can be estimated that the so-called blooming occurs when a stress of the paint film in a bent state concentrates on an interface between the paint film and the base sheet, and the concentrated stress is increased with time or by heating due to an influence of entropy elasticity of the paint film, which leads to the paint film peeling. The blister under paint film can be estimated to occur when a restoration stress of the paint film acts as a force of peeling the paint film, which accelerates the proceeding of corrosion by selecting an interface portion having weak adhesion. Specifically, the use of the Zn—Al—Mg-based alloy plated steel sheet as the base sheet of the pre-coated plated steel sheet improves the corrosion resistance, but it creates new problems in the workability and the corrosion resistance of the pre-coated plated steel sheet. Hereinbelow, these problems will be referred to as "problems at elongated portion."

It can be inferred that the technique of Patent Document 1 described above aims to improve the adhesion by using the coupling agent for the pretreatment, and providing the specific primer capable of reacting with the coupling agent. Here, the steel sheet supposed in Patent Document 1 described above is a cold-rolled steel sheet or a zinc-based plated steel sheet such as a hot-dip galvanized steel sheet, an electrogalvanized steel sheet, an alloyed hot-dip plated steel sheet, and a zinc-nickel alloy plated steel sheet, which is different from the Zn—Al—Mg-based alloy. As a result of studies conducted by the present inventors, it was clarified that when the method of Patent Document 1 described above is actually applied to the primer paint film layer of the Zn—Al—Mg-based alloy plated steel sheet, it is not possible to avoid damage to the primer paint film layer during working and a stress concentration on the plating interface. From such viewpoints, Patent Document 1 described above still has room for improvement.

It can be inferred that the technique of Patent Document 2 described above aims to inhibit the "blooming" at the T bent portion by using the paint film with low elastic strain energy as the intermediate paint film. Here, the metal sheet supposed in Patent Document 2 described above is an aluminum plated steel sheet, a zinc plated steel sheet, an aluminum-zinc plated steel sheet, or a stainless sheet, which is different from the Zn—Al—Mg-based alloy. As a result of studies conducted by the present inventors, it was clarified that when the method of Patent Document 2 described above is actually applied to the primer paint film layer of the Zn—Al—Mg-based alloy plated steel sheet, it is not possible to avoid damage to the primer paint film layer during working and a stress concentration on the plating interface. From such viewpoints, Patent Document 2 described above still has room for improvement.

It can be inferred that the technique of Patent Document 3 described above aims to secure the corrosion resistance by using the rust preventive pigment that is contained in the primer paint film. As a result of studies conducted by the present inventors, it was clarified that when the method of Patent Document 3 described above is actually applied to the primer paint film layer of the Zn—Al—Mg-based alloy plated steel sheet, it is not possible to avoid damage to the primer paint film layer during working and a stress concentration on the plating interface. From such viewpoints, Patent Document 3 described above still has room for improvement.

It can be inferred that the technique of Patent Document 4 described above aims to secure the workability and the corrosion resistance at worked portion by forming the specific epoxy-based water paint into the primer paint film. As a result of studies conducted by the present inventors, it was clarified that when the method of Patent Document 4 described above is actually applied to the primer paint film layer of the Zn—Al—Mg-based alloy plated steel sheet, the performance level is not sufficient since the paint is the water-based paint, and a limit thereof is the 4T bending level. From such viewpoints, Patent Document 4 described above still has room for improvement.

The technique of Patent Document 5 described above aims to inhibit the paint film peeling at the worked portion by making cracks occur in the hard top paint film to release the stress. As a result of studies conducted by the present inventors, it was clarified that when the method of Patent Document 5 described above is actually applied to the Zn—Al—Mg-based alloy plated steel sheet, there is room for improvement regarding the enhancement of workability due to a high glass transition temperature of the primer paint film.

The technique of Patent Document 6 described above aims to improve various characteristics including workability by providing the single-layer thin film containing the vanadium-based or phosphorus-based pigment (rust preventive pigment) on the surface of the Zn—Al—Mg-based alloy plated steel sheet, and controlling the pigment distribution in the paint film. However, as a result of studies conducted by the present inventors, it was clarified that there is still room for improvement regarding a blooming resistance since the method of Patent Document 6 described above is one that aims to improve the corrosion resistance by the effect of the rust preventive pigment.

The present invention has been made in consideration of the above-described problems, and an object of the present invention is to provide a pre-coated plated steel sheet and a molded product, which use a Zn—Al—Mg-based alloy plated steel sheet as a base sheet, and which are capable of further improving, even under 0T bending, corrosion resistance regarding corrosion under paint film at a 0T bent portion and a periphery thereof, without causing the occurrence of cracks and the peeling in the paint film.

Means for Solving the Problems

As a result of earnest studies conducted by the present inventors in order to solve the above-described problems, they came up with conditions that should be satisfied by the paint film. Further, as a result of performing additional studies regarding the configuration of the paint film capable of more easily realizing such conditions, the present inventors found out that when the base sheet is the Zn—Al—Mg-based alloy plated steel sheet, appropriate paint film physical properties differ from those of the conventional galvanized steel sheet as the base sheet. Specifically, they reached a conclusion that the method of reducing the stress of the paint film during working by setting Tg of the resin to a rather high value (namely, by designing the paint film to be rather hard so that the paint film is easily subjected to plastic deformation with respect to a strain), and by decreasing an added amount of a cross-linking agent to reduce a cross-link density, like a conventional way of thinking, is not effective.

Specifically, the present inventors found out that the problems at elongated portion can be more easily improved without deteriorating the paint film performance, by making the resin that has low Tg and high molecular weight and spreads well to be sufficiently hardened without lowering the added amount of the cross-linking agent (specifically, without lowering the cross-link density), to form the paint film capable of dispersing the stress caused by the deformation thereof, in a way contrary to the conventional one. The gist of the present invention, which has been completed based on these findings, is as follows.

(1) A pre-coated plated steel sheet includes: a plating layer composed of Zn—Al—Mg-based alloy plating, the plating layer being positioned on one side or both sides of a steel sheet; a chemical treatment film layer positioned on the plating layer; and a paint film layer positioned on the chemical treatment film, in which the paint film layer includes a primer paint film layer, and an upper paint film layer positioned on the primer paint film layer, and out of conditions below, at least any of the following is satisfied: both a condition (a-1) and a condition (a-2); a condition (b); and a condition (c).

(a-1) A cut strength measured by cutting an interface between the paint film layer and a layer positioned on the steel sheet side relative to the paint film layer by a SAICAS method is 1.00 kN/m or more on average, 5% or less of a cut area is in the form of interfacial peeling, and the remaining cut area is in the form of cohesive failure within the paint film layer.

(a-2) When a portion where a thickness of the pre-coated plated steel sheet after being subjected to uniaxial elongation has decreased by 20% or more when compared to a thickness of a non-molded portion is cut by the SAICAS method, at an interface between the paint film layer and a layer positioned on the steel sheet side relative to the paint film layer, a cut strength is 1.00 kN/m or more on average, 20% or less of a cut area is in the form of interfacial peeling, and the remaining cut area is in the form of cohesive failure within the paint film layer.

(b) An indentation load when a microhardness measuring quadrangular pyramid-shaped indenter is inserted at a rate of 2 μm per minute with respect to a position 1 μm away in a direction of the primer paint film layer from an interface between the primer paint film layer and a layer positioned on the steel sheet side relative to the primer paint film layer, at a cross section obtained by cutting the primer paint film layer in a thickness direction, and the indenter reaches a depth of 10 μm, is less than 1000 mN.

(c) A load curve with respect to a displacement when a microhardness measuring quadrangular pyramid-shaped indenter is inserted at a rate of 10 μm per second to a depth of 10 μm with respect to a position 1 μm away in a direction of the primer paint film layer from an interface between the primer paint film layer and a layer positioned on the steel sheet side relative to the primer paint film layer, at a cross section obtained by cutting the primer paint film layer in the thickness direction, and then the indenter is unloaded at a rate of 2 μm per minute is drawn, and at a plane defined by the displacement and the load, an area of a range surrounded by a straight line corresponding to the displacement of 10 μm, a straight line corresponding to the load of 0, and the load curve when performing the unloading is less than 500 μm·mN.

(2) In the pre-coated plated steel sheet described in (1), the plating layer contains aluminum of 0.5 mass % or more and 60.0 mass % or less, magnesium of 0.5 mass % or more and 15.0 mass % or less, and the balance being composed of zinc and impurities, a thickness of the primer paint film layer is 2 to 10 μm, a total thickness of the primer paint film layer and the upper paint film layer is 10 to 30 μm, and the primer paint film layer contains a polyester-based resin having an average molecular weight of 19000 or more and a glass transition point Tg of less than 40° C., and a curing agent, in which the curing agent contains blocked isocyanate or blocked isocyanate resin.

(3) In the pre-coated plated steel sheet described in (2), a content of the curing agent with respect to a total content of the polyester-based resin and the curing agent is 5 to 15% in terms of mass %.

(4) In the pre-coated plated steel sheet described in (2) or (3), the curing agent further contains melamine or melamine derivative.

(5) In the pre-coated plated steel sheet described in (4), a content of the melamine or melamine derivative with respect to a total content of the blocked isocyanate or blocked isocyanate resin and the melamine or melamine derivative is 20 to 50% in terms of mass %.

(6) In the pre-coated plated steel sheet described in any one of (2) to (5), the average molecular weight of the polyester-based resin is 23000 to 25000.

(7) In the pre-coated plated steel sheet described in any one of (2) to (6), the glass transition point Tg of the polyester-based resin is 0 to 20° C.

(8) In the pre-coated plated steel sheet described in any one of (2) to (7), when the number of substituents capable of reacting with OH groups in the polyester-based resin, in the blocked isocyanate or blocked isocyanate resin, is described as na, and the number of OH groups in the polyester-based resin is described as nb, the sum (na+nb) is 5.5 or more and 8.0 or less.

(9) In the pre-coated plated steel sheet described in any one of (2) to (8), the plating layer is composed of Zn-11% Al-3% Mg-0.2% Si alloy plating that further contains Si in place of a part of Zn being the balance.

(10) A molded product being a molded product that includes a pre-coated plated steel sheet including: a plating layer composed of Zn—Al—Mg-based alloy plating, the plating layer being positioned on one side or both sides of a steel sheet; a chemical treatment film layer positioned on the plating layer; and a paint film layer positioned on the chemical treatment film, the paint film layer including a primer paint film layer, and an upper paint film layer positioned on the primer paint film layer, in which at a portion where a thickness of a plated steel sheet in the molded product has decreased by 20% or more when compared to a thickness of a non-molded portion, a cut strength measured by cutting an interface between the paint film layer and a layer positioned on the steel sheet side relative to the paint film layer by a SAICAS method is 1.00 kN/m or more on average, 20% or less of a cut area is in the form of interfacial peeling, and the remaining cut area is in the form of cohesive failure within the paint film layer.

(11) In the molded product described in (10), the plating layer in the molded product contains aluminum of 5 mass % or more and 15 mass % or less, and magnesium of 2 mass % or more and 4 mass % or less.

Effect of the Invention

As described above, according to the present invention, even when the Zn—Al—Mg-based alloy plated steel sheet is used as the base sheet and 0T bending is performed, it becomes possible to further improve the corrosion resistance regarding the corrosion under paint film at the 0T bent portion and a periphery thereof, without causing the occurrence of cracks and the peeling in the paint film.

EMBODIMENTS FOR CARRYING OUT THE INVENTION

Figure 1A:
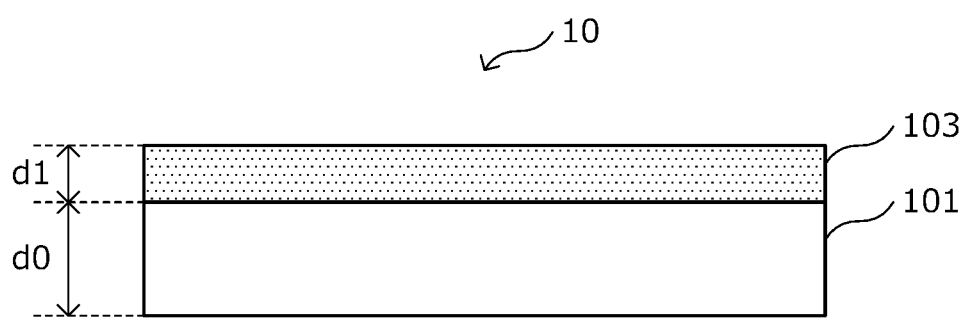
FIG. 1A is an explanatory view schematically illustrating a configuration of a plated steel sheet according to an embodiment of the present invention.

Hereinafter, preferred embodiments of the present invention will be explained in detail while referring to the attached drawings. Note that in this description and the drawings, components having substantially the same functional configuration are denoted by the same reference numerals, thereby omitting their redundant explanations.

(Studies Conducted by Present Inventors)

Before explaining a pre-coated plated steel sheet and a molded product according to embodiments of the present invention, contents of various studies conducted regarding portions having the problems at elongated portion as described above, will be explained in detail hereinbelow.

When the present inventors observed a cross section of a cracked portion of a paint film of a T bent portion of a pre-coated plated steel sheet, it was possible confirm cracks at a number of places in plating of the plated steel sheet, and at a position matching a cracked portion of the paint film, it was always possible to confirm cracks in the plating as well. Specifically, it can be considered that a fracture of plating occurs first by the elongation such as T bending to cause cracks, and in accordance with extensibility of the paint film, cracks occur also in portions corresponding to some percentages of the paint film. When the sheet thickness of the plated steel sheet of such a portion was measured, the sheet thickness decreased from the sheet thickness before molding. From this result, it was clarified that the problems at elongated portion that the present inventors focused on is the problem occurred in the portion where the plated steel sheet was elongated and the sheet thickness was decreased.

Generally, in accordance with the deformation of the plated steel sheet due to elongation, the following is estimated to occur. First, many fine cracks occur in plating as well as a resin paint film of an upper layer, and the cracks become routes through which corrosion factors infiltrate from the outside to a portion under the paint film, which results in lowering the corrosion resistance. Next, by an elastic stress due to working of the paint film, paint film peeling (a phenomenon so-called "blooming") proceeds with time in actual usage or by heating of a worked portion. The "blooming" occurs even if cracks do not occur in the paint film, and if anything, it occurs more frequently when cracks do no exist and a stress is large. Besides, in the actual usage at a salt damage area, corrosion under paint film (blister under paint film) that reaches a plane portion from a T bent portion proceeds. This is because a restoration stress of the paint film acts as a force of peeling the paint film, and the corrosion selectively proceeds rapidly at a deformed portion of the steel sheet, or even a non-deformed portion at an interface portion between the plating and the paint film at which the adhesion is weakened by ironing by a mold.

As a result of studies conducted by the present inventors, they came to the conclusion that the following three influencing factors (1) to (3) should be considered as factors that determine the presence or absence of the occurrence of the problems at elongated portion as described above. If these influencing factors are in a good state overall, it is believed that the problems at elongated portion will be suppressed.

(1) Soundness of plated surface after working with elongation (presence or absence of irregularities or cracks)
(2) Adhesion between plating and primer paint film through chemical treatment film after working with elongation
(3) State of entire paint film including top paint film deformed by working with elongation (presence or absence of cracks and internal stress)

Since the problems at elongated portion as described above is likely to occur in pre-coated plated steel sheets that use Zn—Al—Mg-based alloy plated steel sheets as the base sheet, and further, the likeliness of the occurrence of problems at elongated portion differs depending on the types of paint film, the present inventors focused on paint film physical properties that exert influences on (3) above, and conducted further studies.

As a result of this, the present inventors came up with an idea that a resin paint film (primer paint film) that is brought into contact with the base sheet of the pre-coated plated steel sheet that uses the Zn—Al—Mg-based alloy plated steel sheet as the base sheet, is required to satisfy at least any of the following two points.

The first point is that a fracture due to cohesive failure does not occur due to the working as described above. The fracture of paint film due to working means that the extensibility of the paint film is insufficient. The paint film is required to have the extensibility that is sufficient enough to cause no cracks in the paint film even at a portion subjected to a large amount of working with deformation of the steel sheet.

The second point is that a stress of the paint film is sufficiently small in a state of receiving the deformation due to the working as described above. When the stress of the paint film in the state of receiving the deformation is large, the stress concentrates on an interface between the paint film and the plating. When the concentrated stress exceeds an interface adhesion force at the worked portion, the peeling of the paint film occurs.

The present inventors conducted studies regarding the means capable of determining the above first point, and consequently, they reached a conclusion that observation of peel form and measurement of cut strength by cutting the paint film by a SAICAS method (Surface and Interfacial Cutting Analysis System) are effective. It is possible to determine whether or not the above first point is satisfied, based on whether the peel form of the primer paint film to be a measuring object is the cohesive failure of the primer paint film layer or not, and whether the cut strength has a sufficiently high value or not.

The SAICAS method is a method in which a sharp blade is used to perform cutting from the surface of a sample to the adhesive interface between a base and an adherend at an ultra-low speed to measure the cut strength. Therefore, it is possible to observe the cut strength and the peel state at the interface between specific layers of a laminated multilayer film, which has been difficult to be measured by the conventional method.

Concretely, the satisfaction of both the following two conditions (i) and (ii) corresponds to the condition regarding the above first point.

(i) When a plane portion of a pre-coated plated steel sheet is cut by the SAICAS method, a cut strength at an interface between a paint film layer and a layer positioned on a steel sheet side relative to the paint film layer (more specifically, an interface between a primer paint film layer and a chemical treatment film layer or a plating layer positioned on the steel sheet side relative to the primer paint film layer) is 1.00 kN/m or more on average, 5% or less of a cut area is in the form of interfacial peeling, and the remaining cut area is in the form of cohesive failure within the paint film layer (more specifically, within the primer paint film layer).

(ii) When a portion where a thickness of the pre-coated plated steel sheet after being subjected to uniaxial elongation has decreased by 20% or more when compared to a thickness of a non-molded portion is cut by the SAICAS method, at an interface between the paint film layer and a layer positioned on the steel sheet side relative to the paint film layer (more specifically, an interface between the primer paint film layer and the chemical treatment film layer or the plating layer positioned on the steel sheet side relative to the primer paint film layer), a cut strength is 1.00 kN/m or more on average, 20% or less of a cut area is in the form of interfacial peeling, and the remaining cut area is in the form of cohesive failure within the paint film layer (more specifically, within the primer paint film layer).

Further, the present inventors conducted studies regarding the means capable of determining the above second point, and consequently, they reached a conclusion that a method of microhardness measurement performed by indentation of a quadrangular pyramid-shaped indenter, the method being typified by the Vickers hardness measuring method, is effective.

It is possible to determine whether or not the above second point is satisfied based on at least any one of the following. (iii) A displacement-load curve when the indenter is pushed into the paint film at a sufficiently low speed is drawn, and a value of load at a predetermined displacement (a push-back force of the paint film at that time) is measured, and (iv) elastic strain energy is determined from a load curve when the indenter is pushed into the paint film to a predetermined depth at a high speed and then the indenter is unloaded, and a displacement of recovery of the paint film.

Concretely, the satisfaction of at least either of the following conditions corresponds to the condition under which the above second point is satisfied. (iii) An indentation load when a microhardness measuring quadrangular pyramid-shaped indenter is inserted at a rate of 2 μm per minute with respect to a position 1 μm away in a direction of the primer paint film layer from an interface between the primer paint film layer and a layer positioned on the steel sheet side relative to the primer paint film layer, at a cross section obtained by cutting the primer paint film layer in a thickness direction, and the indenter reaches a depth of 10 μm is less than 1000 mN, and (iv) a load curve with respect to a displacement when a microhardness measuring quadrangular pyramid-shaped indenter is inserted at a rate of 10 μm per second to a depth of 10 μm with respect to a position 1 μm away in a direction of the primer paint film layer from an interface between the primer paint film layer and a layer positioned on the steel sheet side relative to the primer paint film layer, at a cross section obtained by cutting the primer paint film layer in the thickness direction, and then the indenter is unloaded at a rate of 2 μm per minute is drawn, and at a plane defined by the displacement and the load, an area of a range surrounded by a straight line corresponding to the displacement of 10 μm, a straight line corresponding to the load of 0, and the load curve when performing the unloading is less than 500 μm·mN.

Here, the reason why the "interface with the layer positioned on the steel sheet side" is set in the above three types of determination methods, is because the thickness of the chemical treatment film layer is generally about 0.1 μm, which is extremely thin, and thus there is a case where the chemical treatment film layer is integrated with the primer paint film layer, and an interface between the primer paint film layer and the chemical treatment film layer cannot be specified.

As described above, it was clarified that the problems at elongated portion can be suppressed by applying, as the primer paint film layer of the pre-coated plated steel sheet using the Zn—Al—Mg-based alloy plated steel sheet as the base sheet, the paint film satisfying at least either of the contents described regarding the above first point and the contents described regarding the second point (most preferably, the paint film simultaneously satisfying the contents described regarding the above first point and the contents described regarding the second point).

Further, the present inventors studied the cut strength and the peel form at the interface between the chemical treatment film layer or the paint film layer (more specifically, the primer paint film layer) and the plating layer of a molded body obtained by molding the above-described pre-coated plated steel sheet. In a conventional peel test, it was possible to measure the peel strength of the paint film of the pre-coated steel sheet, but it was not possible to accurately measure the peel strength and the peel form of an elongated portion of the plated steel sheet forming the molded body. The present inventors evaluated the cut strength and the peel form using the SAICAS method as a method capable of simultaneously measuring these portions.

The present inventors prepare a sample of the elongated portion of the plated steel sheet of the molded body, focused on the portion where the thickness has decreased when compared to the thickness of the plated steel sheet before molding as an elongation-dominant molded portion, and measured this portion by using the SAICAS method, to thereby obtain the following findings.

Specifically, it was found out that in the molded body formed of the pre-coated plated steel sheet that does not cause the cracks and the paint film peeling at the elongated portion as described above, the peel form of the paint film is not in the form of interfacial peeling at the interface between the chemical treatment film layer or the paint film layer (more specifically, the primer paint film layer) and the plating layer, but in the form of cohesive failure of the paint film layer (more specifically, the primer paint film layer), and the cut strength of certain level or more is obtained.

Consequently, it became clear that when the cut strength of the elongated portion of the plated steel sheet by the SAICAS method (that is, the portion where the thickness of the plated steel sheet of the molded product has decreased by 20% or more when compared to that before molding (which can also be considered as a non-molded portion)) is 1.00 kN/m or more on average, 20% or less of a cut area is in the form of interfacial peeling, and the remaining cut area is in the form of cohesive failure within the paint film (for example, within the primer paint film when the paint film is composed of a plurality of layers), it is possible to obtain the molded product formed of the pre-coated plated steel sheet excellent in the cracking resistance of the paint film, the paint film adhesion, and the corrosion resistance at the elongated portion.

Here, the form of interfacial peeling refers to any of cohesive failure of the chemical treatment film layer, interfacial peeling between the chemical treatment film layer and the paint film layer (more specifically, the primer paint film layer), and interfacial peeling between the chemical treatment film layer and the plating layer, or a combined form of these states. However, since the film thickness of the chemical treatment film is extremely thin as described above, it is often the case where the chemical treatment film is integrated with the plating layer or the paint film layer (more specifically, the primer paint film layer), and thus the above peel form cannot be visually distinguished.

As a result of further studies regarding the primer paint film layer satisfying the above conditions, based on the findings as described above, the present inventors could further obtain the following findings. Specifically, they came up with an idea that it is preferable to adopt, as the primer paint film layer that is brought into contact with the base sheet of the pre-coated plated steel sheet using the Zn—Al—Mg-based alloy plated steel sheet as the base sheet, a paint film formed by making a resin that has low glass transition point (Tg) and high molecular weight and spreads well to be sufficiently hardened without lowering an added amount of a cross-linking agent (specifically, without lowering a cross-link density), and in which a stress is dispersed during the deformation thereof to prevent an excessive stress from being applied to the adhesive interface with the base sheet. By using such a paint film, it can be expected that it is possible to improve the problems at elongated portion without lowering the paint film performance such as the chemical resistance.

When the base sheet is the Zn—Al—Mg-based alloy plated steel sheet, it can be considered that the conventional design concept of the paint film such that the stress of the paint film during working is reduced by setting Tg of the resin to a rather high value (namely, by designing the paint film to be rather hard so that the paint film is easily subjected to plastic deformation with respect to a strain), and by reducing an added amount of the cross-linking agent to reduce the cross-link density, is not effective based on two reasons, unlike the case where the galvanized steel sheet is the base sheet.

The first reason is that a barrier effect of the paint film is lowered by reducing the cross-link density, which makes it easy for a corrosion factor to permeate and infiltrate the paint film, resulting in that the chemical resistance and the corrosion resistance cannot be maintained. The Zn—Al—Mg-based alloy plating is excellent in corrosion resistance when compared to pure zinc plating, but since it contains chemically-unstable Mg, it is likely to be corroded by chemicals. A case where chemicals permeate the paint film to reach the plating layer of the base sheet, becomes a cause of bringing about a paint film blister due to poor chemical resistance. Regarding the corrosion resistance as well, since the corrosion resistance is lowered by the infiltration of the corrosion factor, it is not possible to exhibit excellent corrosion resistance inherent in the Zn—Al—Mg-based alloy plating.

The second reason is that the cohesive force of the paint film cannot be maintained by the reduction in cross-link density. When the galvanized steel sheet is the base sheet, as in the conventional case, the plating is uniformly elongated and compressed by working, and thus the paint film can also deform uniformly to follow the elongation and the compression. However, the Zn—Al—Mg-based alloy plating is hard and non-uniform, so that great deformation (cracks or compressive strain) occurs locally due to working. The paint film also deforms greatly in accordance with such a great deformation of plating, so that if the cohesive force of the paint film is not sufficient, the cohesive failure occurs within the paint film layer, which, if anything, causes the paint film peeling.

As described above, when the base sheet is the Zn—Al—Mg-based alloy plated steel sheet, it is necessary to design the paint film in a manner different from that of the conventional galvanized steel sheet.

As a result of studies conducted by the present inventors regarding a new design of the primer paint film layer, it was clarified that it is possible to realize the conditions as described above when appropriate Tg of the resin is less than 40° C., appropriate average molecular weight of the resin is 19000 or more, and blocked isocyanate is used as a curing agent to realize appropriate cross-linking, although details thereof will be explained again below.

With respect to the paint film as described above and the steel sheet provided with the paint film, it is required that when the paint film is deformed by following the deformation of the base sheet due to pressing, the stress due to the deformation of the paint film is not large, and the stress is dispersed to prevent the stress from concentrating on the interface between the base sheet and the paint film. In order to realize that, it was clarified that it is effective to use the paint film based on the design manual as described above as the primer paint film layer, and to use the primer paint film layer as a lower layer of the upper paint film layer.

Hereinafter, there will be explained in detail the precoated plated steel sheet and the molded product according to the embodiments of the present invention, which have been completed based on the above findings.

(Regarding Zn—Al—Mg-Based Alloy Plated Steel Sheet to be Base Sheet)

First, the Zn—Al—Mg-based alloy plated steel sheet being the base sheet of the pre-coated plated steel sheet according to an embodiment of the present invention will be explained in detail while referring to FIG. 1A and FIG. 1B.

Figure 1B:
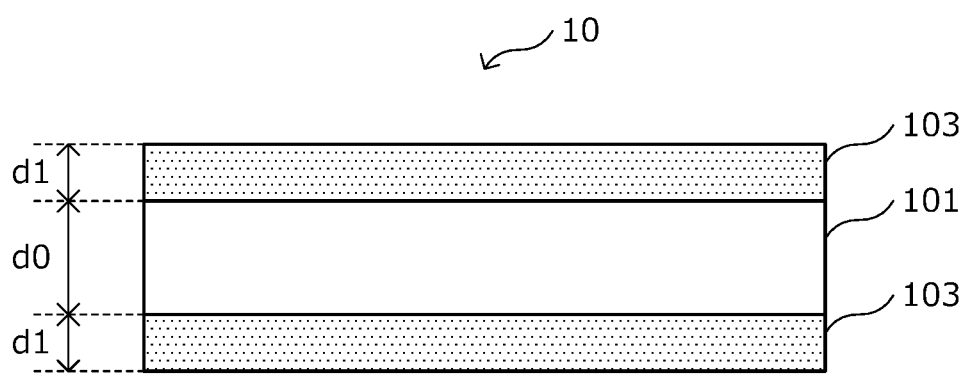
FIG. 1B is an explanatory view schematically illustrating a configuration of a plated steel sheet according to the same embodiment.

FIG. 1A is an explanatory view schematically illustrating an example of a structure of the Zn—Al—Mg-based alloy plated steel sheet according to the present embodiment, and FIG. 1B is an explanatory view schematically illustrating another example of the structure of the Zn—Al—Mg-based alloy plated steel sheet according to the present embodiment.

As schematically illustrated in FIG. 1A, a Zn—Al—Mg-based alloy plated steel sheet 10 according to the present embodiment includes a steel sheet 101 serving as a base material, and a Zn—Al—Mg-based alloy plating layer 103 as an example of the plating layer and positioned on one side of the steel sheet. Further, in the Zn—Al—Mg-based alloy plated steel sheet 10 according to the present embodiment, the Zn—Al—Mg-based alloy plating layers 103 may be positioned on both sides of the steel sheet 101 serving as the base material, as schematically illustrated in FIG. 1B.

<Regarding Steel Sheet 101>

Various steel sheets can be used for the steel sheet 101 used as the base material of the Zn—Al—Mg-based alloy plated steel sheet 10 according to the present embodiment, depending on the mechanical strength, or the like required of the Zn—Al—Mg-based alloy plated steel sheet 10. As such a steel sheet 101, there can be cited various steel sheets such as, for example, Al-killed steel, ultralow carbon steel containing Ti, Nb, and the like, and high-strength steel obtained by making the ultralow carbon steel further contain strengthening elements such as P, Si, and Mn.

Further, a thickness of the steel sheet 101 according to the present embodiment (a thickness d0 in FIG. 1A and FIG. 1B) may be appropriately set according to the mechanical strength, or the like required of the Zn—Al—Mg-based alloy plated steel sheet 10, and can be set to about 0.2 mm to 2.0 mm, for example.

<Regarding Zn—Al—Mg-Based Alloy Plating Layer 103>

The Zn—Al—Mg-based alloy plating layer 103 (which will be sometimes abbreviated to a "plating layer 103" hereinbelow) according to the present embodiment is a layer to be formed on at least one surface of the steel sheet 101, as schematically illustrated in FIG. 1A and FIG. 1B, and is provided to improve the corrosion resistance of the Zn—Al—Mg-based alloy plated steel sheet 10. First, the chemical composition of the Zn—Al—Mg-based alloy plating layer 103 according to the present embodiment will be explained below.

The Zn—Al—Mg-based alloy plating layer 103 according to the present embodiment is, for example, a plating layer containing: in terms of mass %, aluminum (Al): 0.5% or more and 60.0% or less; magnesium (Mg): 0.5% or more and 15.0% or less; and the balance being composed of zinc (Zn) and impurities.

[Al: 0.5 to 60.0 Mass %]

The Zn—Al—Mg-based alloy plating layer 103 according to the present embodiment preferably contains Al of 0.5 mass % or more and 60.0 mass % or less. By setting the content of Al to 0.5 mass % or more and 60.0 mass % or less, the corrosion resistance of the Zn—Al—Mg-based alloy plated steel sheet according to the present embodiment improves, and the adhesion of the Zn—Al—Mg-based alloy plating layer 103 (more specifically, the adhesion to the steel sheet 101) can be secured. When the content of Al is less than 0.5 mass %, the Zn—Al—Mg-based alloy plating layer 103 becomes brittle, and the adhesion of the Zn—Al—Mg-based alloy plating layer 103 decreases in some cases. The content of Al is more preferably 5.0 mass % or more. On the other hand, when the content of Al exceeds 60.0 mass %, the effect of improving the corrosion resistance of the Zn—Al—Mg-based alloy plated steel sheet 10 is saturated in some cases. The content of Al is more preferably 15.0 mass % or less.

[Mg: 0.5 to 15.0 Mass %]

The Zn—Al—Mg-based alloy plating layer 103 according to the present embodiment preferably contains Mg of 0.5 mass % or more and 15.0 mass % or less. By setting the content of Mg to 0.5 mass % or more and 15.0 mass % or less, the corrosion resistance of the Zn—Al—Mg-based alloy plated steel sheet 10 according to the present embodiment improves, and the adhesion of the Zn—Al—Mg-based alloy plating layer 103 (more specifically, the adhesion to the steel sheet 101) can be secured. When the content of Mg is less than 0.5 mass %, the effect of improving the corrosion resistance of the Zn—Al—Mg-based alloy plated steel sheet 10 becomes insufficient in some cases. The content of Mg is more preferably 2.0 mass % or more. On the other hand, when the content of Mg exceeds 15.0 mass %, the Zn—Al—

Mg-based alloy plating layer 103 becomes brittle, and the adhesion of the Zn—Al—Mg-based alloy plating layer 103 decreases in some cases. The content of Mg is more preferably 4.0 mass % or less.

[Balance: Zn and Impurities]

In the Zn—Al—Mg-based alloy plating layer 103 according to the present embodiment, the balance other than the above components is Zn and impurities. Further, the Zn—Al—Mg-based alloy plating layer 103 according to the present embodiment may contain silicon (Si) in a content of 0 mass % or more and 2.0 mass % or less in place of a part of Zn being the balance.

[Si: 0 to 2.0 Mass %]

The Zn—Al—Mg-based alloy plating layer 103 according to the present embodiment may contain Si of 0 mass % or more and 2.0 mass % or less in place of a part of Zn being the balance. By setting the content of Si to 0 mass % or more and 2.0 mass % or less, the adhesion of the Zn—Al—Mg-based alloy plating layer 103 can be further improved. When the content of Si exceeds 2.0 mass %, the effect of improving the adhesion of the Zn—Al—Mg-based alloy plating layer 103 is saturated in some cases. The content of Si is more preferably 1.6 mass % or less.

Further, in the Zn—Al—Mg-based alloy plating layer 103 according to the present embodiment, 1 mass % or less of elements such as Fe, Sb, and Pb may be contained alone or in combination in place of a part of Zn being the balance.

As the plated steel sheet 10 provided with the Zn—Al—Mg-based alloy plating layer 103 having the chemical composition as described above, there can be cited, for example, such a hot-dip zinc-aluminum-magnesium-silicon alloy plated steel sheet as a plated steel sheet including a Zn-11% Al-3% Mg-0.2% Si alloy plating layer (for example, "SuperDyma (registered trademark)" and "ZAM (registered trademark)" manufactured by Nippon Steel Corporation), and so on.

[Regarding Average Film Thickness of Plating Layer 103]

In the Zn—Al—Mg-based alloy plated steel sheet 10 according to the present embodiment, an average film thickness (a thickness d1 in FIG. 1A and FIG. 1B) of the Zn—Al—Mg-based alloy plating layer 103 is preferably 6 μm or more, and more preferably 9 μm or more, for example. Since the Zn—Al—Mg-based alloy plating layer 103 has such an average film thickness, the corrosion resistance of the Zn—Al—Mg-based alloy plated steel sheet 10 can be further improved. Note that when the average film thickness d1 of the Zn—Al—Mg-based alloy plating layer 103 exceeds 45 μm, the influence of the increase in plating cost is greater than the improvement in corrosion resistance. Therefore, from an economic point of view, the average film thickness d1 of the Zn—Al—Mg-based alloy plating layer 103 is preferably 45 μm or less.

Note that the average film thickness d1 of the Zn—Al—Mg-based alloy plating layer 103 can be calculated by the following gravimetric method, for example. That is, a Zn—Al—Mg-based alloy plated steel sheet having a predetermined area (for example, 50 mm×50 mm) is dissolved in hydrochloric acid containing an inhibitor, and the dissolved weight is calculated by the difference in weight before and after dissolution. The weight ratio of elements such as Al, Zn, and Fe contained in a solution is separately measured and calculated by high-frequency inductively coupled plasma (Inductively Coupled Plasma: ICP) emission spectrometry, and the average specific gravity of the Zn—Al—Mg-based alloy plating layer is calculated from the ratio. The average film thickness d1 of the Zn—Al—Mg-based alloy plating layer 103 is calculated by dividing the dissolved weight by the average specific gravity and then dividing the resultant by the area (or the area×2 in the case of double-sided plating).

The Zn—Al—Mg-based alloy plated steel sheet 10 according to the present embodiment has been explained above in detail with reference to FIG. 1A and FIG. 1B.

The Zn—Al—Mg-based alloy plated steel sheet 10 according to the present embodiment as explained above can be manufactured as follows, for example. First, pretreatments such as washing and degreasing are performed on the surface of the prepared steel sheet 101 as necessary. Thereafter, an ordinary non-oxidizing furnace type hot-dip plating method is applied to the steel sheet 101 after being subjected to the pretreatments as necessary, to thereby form a plating layer.

Here, a hot-dip galvanizing bath containing desired chemical composition (that is, a hot-dip galvanizing bath containing at least Al: 0.5 to 60.0 mass % and Mg: 0.5 to 15.0 mass %, and the balance being composed of Zn and impurities) is prepared, and the bath temperature of such a plating bath is controlled to about 450° C. After that, the obtained steel sheet 101 is immersed in the plating bath to apply hot-dip galvanization to the surface of the steel sheet so as to obtain a desired average film thickness. Thereafter, a cooling rate after plating is controlled to 10° C./second or more. Thereby, the Zn—Al—Mg-based alloy plating layer can be formed.

(Regarding Pre-Coated Plated Steel Sheet)

Next, a pre-coated plated steel sheet 20 using the Zn—Al—Mg-based alloy plated steel sheet 10 as explained above will be explained in detail with reference to FIG. 2A and FIG. 2B.

Figure 2A:
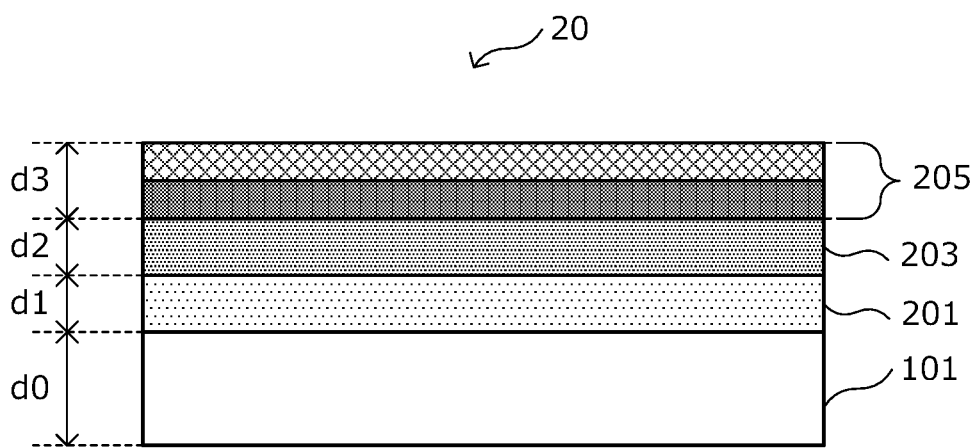
FIG. 2A is an explanatory view schematically illustrating a configuration of a pre-coated plated steel sheet according to the same embodiment.
Figure 2B:
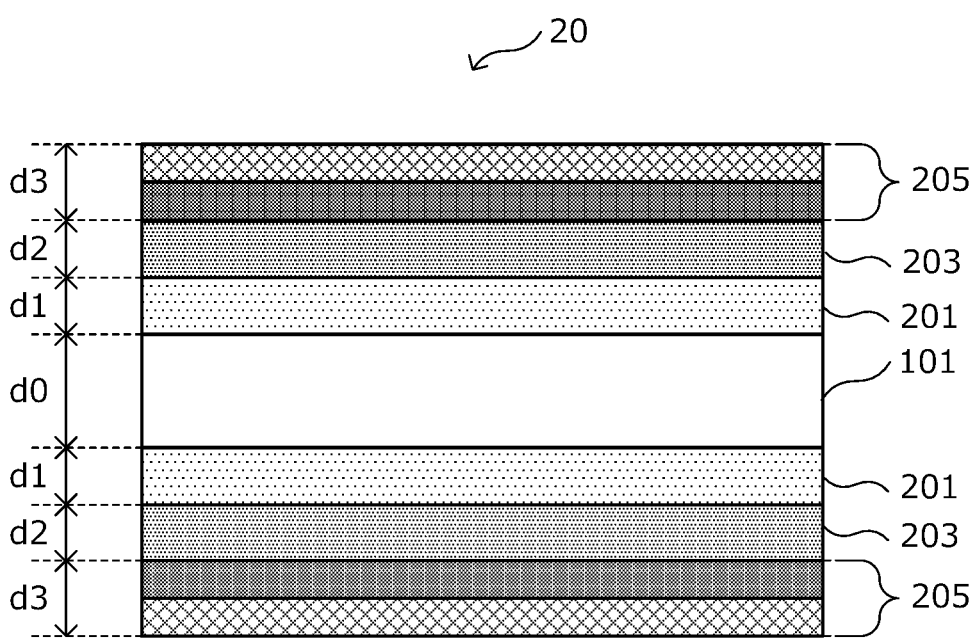
FIG. 2B is an explanatory view schematically illustrating a configuration of a pre-coated plated steel sheet according to the same embodiment.

FIG. 2A is an explanatory view schematically illustrating an example of a structure of a pre-coated plated steel sheet according to the present embodiment, and FIG. 2B is an explanatory view schematically illustrating another example of the structure of the pre-coated plated steel sheet according to the present embodiment.

As schematically illustrated in FIG. 2A, the pre-coated plated steel sheet 20 according to the present embodiment is one using the Zn—Al—Mg-based alloy plated steel sheet 10 explained previously, for example, as the base material, and includes a steel sheet 101, a Zn—Al—Mg-based alloy plating layer 201 positioned on one side of the steel sheet 101, a chemical treatment film layer 203 positioned on the Zn—Al—Mg-based alloy plating layer 201, and a paint film layer 205 positioned on the chemical treatment film layer 203. Further, the pre-coated plated steel sheet 20 according to the present embodiment may include the Zn—Al—Mg-based alloy plating layers 201, the chemical treatment films 203, and the paint films 205 formed on both sides of the steel sheet 101, as schematically illustrated in FIG. 2B.

Here, the steel sheet 101 in the pre-coated plated steel sheet 20 according to the present embodiment has the same configuration as the steel sheet 101 in the Zn—Al—Mg-based alloy plated steel sheet 10 explained previously, and exhibits the same effect, so that its detailed explanation will be omitted below.

Further, regarding the Zn—Al—Mg-based alloy plating layer 201 in the pre-coated plated steel sheet 20 according to the present embodiment, along with the formation of the chemical treatment film layer 203 to be described later, interdiffusion or the like of atoms or the like contained in each layer may occur in the vicinity of an interface between the Zn—Al—Mg-based alloy plating layer 201 and the chemical treatment film layer 203. However, the average chemical composition of the Zn—Al—Mg-based alloy plating layer 201 is the same as that of the Zn—Al—Mg-based alloy plating layer 103 in the Zn—Al—Mg-based alloy plated steel sheet 10 explained previously, and the same effect is exhibited, so that its detailed explanation will be omitted below.

<Regarding Chemical Treatment Film Layer 203>

The chemical treatment film layer 203 according to the present embodiment is a film layer positioned on the Zn—Al—Mg-based alloy plating layer 201, and is a layer formed by a chemical treatment after removing impurities such as oil and surface oxides adhering to the surface of the Zn—Al—Mg-based alloy plated steel sheet 10 by well-known degreasing step and washing step.

The chemical treatment film layer 203 according to the present embodiment may contain any one or more selected from a group consisting of a resin, a silane coupling agent, a zirconium compound, silica, phosphoric acid and its salt, fluoride, a vanadium compound, and tannin or tannic acid, for example. These substances are contained, to thereby further improve the film formability obtained after applying a chemical treatment solution, the barrier property (denseness) of the film against corrosion factors such as moisture and corrosive ions, the film adhesion to the Zn—Al—Mg-based alloy plated surface, and the like, resulting in contribution to the improvement in the corrosion resistance of the film.

In particular, when the chemical treatment film layer 203 contains any one or more of a silane coupling agent and a zirconium compound, a cross-linked structure is formed within the film layer 203, which strengthens bonding with the Zn—Al—Mg-based alloy plated surface as well, resulting in that it becomes possible to further improve the adhesion and the barrier property of the film.

Further, when the chemical treatment film layer 203 contains any one or more of silica, phosphoric acid and its salt, fluoride, and a vanadium compound, these substances function as inhibitors and form a precipitation film or passive film on the Zn—Al—Mg-based alloy plating or steel surface, resulting in that it becomes possible to further improve the corrosion resistance.

In the following, each component that can be contained in the chemical treatment film layer 203 as described above will be described in detail while citing examples.

[Resin]

The resin is not particularly limited, and well-known organic resins such as a polyester resin, a polyurethane resin, an epoxy resin, a phenol resin, an acrylic resin, and a polyolefin resin, for example, can be used. To further improve the adhesion to the plated steel sheet for pre-coated steel sheet, it is preferable to use at least one of the resins (polyester resin, urethane resin, epoxy resin, acrylic resin, and so on) having a forced site or polar functional group in a molecular chain. The resins may be used alone or in combination of two or more.

The content of the resin in the chemical treatment film layer 203 is preferably, for example, 0 mass % or more and 85 mass % or less with respect to the solid content of the film. The content of the resin is more preferably 0 mass % or more and 60 mass % or less, and still more preferably 1 mass % or more and 40 mass % or less. When the content of the resin exceeds 85 mass %, the ratio of the other film components may decrease, and the performance required as the film other than corrosion resistance may decrease.

[Silane Coupling Agent]

As the silane coupling agent, there can be cited, for example, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropylmethyldimethoxysilane, γ-methacryloxypropyltrimethoxysilane, γ-methacryloxypropylmethyldimethoxysilane, γ-methacryloxypropyltriethoxysilane, γ-methacryloxypropylmethyldiethoxysilane, N-β-(N-vinylbenzylaminoethyl)-γ-aminopropyltrimethoxysilane, N-β-(N-vinylbenzylaminoethyl)-γ-aminopropylmethyldimethoxysilane, N-β-(N-vinylbenzylaminoethyl)-γ-aminopropyltriethoxysilane, N-β-(N-vinylbenzylaminoethyl)-γ-aminopropylmethyldiethoxysilane, γ-glycidoxypropyltrimethoxysilane, γ-glycidoxypropylmethyldimethoxysilane, γ-glycidoxypropyltriethoxysilane, γ-glycidoxypropylmethyldiethoxysilane, γ-mercaptopropyltrimethoxysilane, γ-mercaptopropylmethyldimethoxysilane, γ-mercaptopropyltriethoxysilane, γ-mercaptopropylmethyldiethoxysilane, methyltrimethoxysilane, dimethyldimethoxysilane, methyltriethoxysilane, dimethyldiethoxysilane, vinyltriacetoxysilane, γ-chloropropyltrimethoxysilane, γ-chloropropylmethyldimethoxysilane, γ-chloropropyltriethoxysilane, γ-chloropropylmethyldiethoxysilane, hexamethyldisilazane, γ-anilinopropyltrimethoxysilane, γ-anilinopropylmethyldimethoxysilane, γ-anilinopropyltriethoxysilane, γ-anilinopropylmethyldiethoxysilane, vinyltrimethoxysilane, vinylmethyldimethoxysilane, vinyltriethoxysilane, vinylmethyldiethoxysilane, octadecyldimethyl [3-(trimethoxysilyl)propyl]ammonium chloride, octadecyldimethyl [3-(methyl dimethoxysilyl)propyl]ammonium chloride, octadecyldimethyl [3-(triethoxysilyl)propyl]ammonium chloride, octadecyldimethyl [3-(methyl diethoxysilyl)propyl]ammonium chloride, γ-chloropropylmethyldimethoxysilane, γ-mercaptopropylmethyldimethoxysilane, methyltrichlorosilane, dimethyldichlorosilane, trimethylchlorosilane, and so on. The added amount of the silane coupling agent in a chemical treatment agent for forming the chemical treatment film layer 203 can be set to, for example, 2 to 80 g/L. When the added amount of the silane coupling agent is less than 2 g/L, the adhesion to the plated surface may be insufficient, leading to a decrease in the work adhesion of the paint film. Further, when the added amount of the silane coupling agent exceeds 80 g/L, the cohesive force of the chemical treatment film layer may be insufficient, leading to a decrease in the work adhesion of the paint film layer. The silane coupling agents as described as examples above may be used alone or in combination of two or more.

[Zirconium Compound]

As the zirconium compound, there can be cited, for example, zirconium normal propylate, zirconium normal butyrate, zirconium tetraacetylacetonate, zirconium monoacetylacetonate, zirconium bisacetylacetonate, zirconium monoethylacetoacetate, zirconium acetylacetonate bisethylacetoacetate, zirconium acetate, zirconium monostearate, zirconium carbonate, zirconium ammonium carbonate, potassium zirconium carbonate, sodium zirconium carbonate, and so on. The added amount of the zirconium compound in the chemical treatment agent for forming the chemical treatment film layer 203 can be set to, for example, 2 to 80 g/L. When the added amount of the zirconium compound is less than 2 g/L, the adhesion to the plated surface may be insufficient, leading to a decrease in the work adhesion of the paint film. Further, when the added amount of the zirconium compound exceeds 80 g/L, the cohesive force of the chemical treatment film layer may be insufficient, leading to a decrease in the work adhesion of the paint film layer. Such zirconium compounds may be used alone or in combination of two or more.

[Silica]

As the silica, there can be used, for example, commercially available silica gels such as "SNOWTEX N," "SNOWTEX C," "SNOWTEX UP," and "SNOWTEX PS" manufactured by Nissan Chemical Corporation, and "ADELITE AT-20Q" manufactured by ADEKA CORPORATION, or powdered silica such as AEROSIL #300 manufactured by NIPPON AEROSIL CO., LTD. Silica can be appropriately selected according to the required performance of the pre-coated plated steel sheet. The added amount of the silica in the chemical treatment agent for forming the chemical treatment film layer 203 is preferably set to 1 to 40 g/L. When the added amount of the silica is less than 1 g/L, the work adhesion of the paint film layer may decrease, and when the added amount of the silica exceeds 40 g/L, the effects of work adhesion and corrosion resistance are highly likely to be saturated, which is uneconomical.

[Phosphoric Acid and its Salt]

As the phosphoric acid and its salt, there can be cited, for example, phosphoric acids such as orthophosphoric acid, metaphosphoric acid, pyrophosphoric acid, triphosphoric acid, and tetraphosphoric acid and salts thereof, ammonium salts such as triammonium phosphate and diammonium hydrogen phosphate, phosphonic acids such as aminotri(methylenephosphonic acid), 1-hydroxyethylidene-1,1-diphosphonic acid, ethylenediaminetetra(methylenephosphonic acid), and diethylenetriaminepenta(methylenephosphonic acid) and salts thereof, organic phosphoric acids such as phytic acid and salts thereof, and so on. Note that as salts of phosphoric acid other than ammonium salts, there can be cited metal salts with Na, Mg, Al, K, Ca, Mn, Ni, Zn, Fe, and so on. The phosphoric acid and its salt may be used alone or in combination of two or more.

Note that the content of the phosphoric acid and its salt is preferably 0 mass % or more and 20 mass % or less with respect to the solid content of the film. When the content of the phosphoric acid and its salt exceeds 20 mass %, the film becomes brittle, and the work adhesion of the film may decrease when the pre-coated plated steel sheet is molded. The content of the phosphoric acid and its salt is more preferably 1 mass % or more and 10 mass % or less.

[Fluoride]

As the fluoride, there can be cited, for example, ammonium zirconium fluoride, ammonium silicofluoride, ammonium titanium fluoride, sodium fluoride, potassium fluoride, calcium fluoride, lithium fluoride, titanium hydrofluoride, zirconium hydrofluoride, and so on. Such fluorides may be used alone or in combination of two or more.

Note that the content of the fluoride is preferably 0 mass % or more and 20 mass % or less with respect to the solid content of the film. When the content of the fluoride exceeds 20 mass %, the film becomes brittle, and the work adhesion of the film may decrease when the pre-coated plated steel sheet is molded. The content of the fluoride is more preferably 1 mass % or more and 10 mass % or less.

[Vanadium Compound]

As the vanadium compound, there can be cited, for example, vanadium compounds obtained by reducing pentavalent vanadium compounds such as vanadium pentoxide, metavanadic acid, ammonium metavanadate, sodium metavanadate, and vanadium oxytrichloride to 2 to 4 valences with a reducing agent, vanadium compounds with oxidation numbers of 4 to 2 valences, such as vanadium trioxide, vanadium dioxide, vanadium oxysulfate, vanadium oxyoxalate, vanadium oxyacetylacetonate, vanadium acetylacetonate, vanadium trichloride, phosphovanadomolybdic acid, vanadium sulfate, vanadium dichloride, and vanadium oxide, and so on. Such vanadium compounds may be used alone or in combination of two or more.

Note that the content of the vanadium compound is preferably 0 mass % or more and 20 mass % or less with respect to the solid content of the film. When the content of the vanadium compound exceeds 20 mass %, the film becomes brittle, and the work adhesion of the film may decrease when the pre-coated plated steel sheet is molded. The content of the vanadium compound is more preferably 1 mass % or more and 10 mass % or less.

[Tannin or Tannic Acid]

As tannin or tannic acid, it is possible to use either of hydrolyzable tannin and condensed tannin. As examples of tannin and tannic acid, there can be cited hamamelitannin, gall tannin, gallnut tannin, myrobalan tannin, divi-divi tannin, algarovilla tannin, valonia tannin, catechin, and so on. The added amount of the tannin or tannic acid in the chemical treatment agent for forming the chemical treatment film 203 can be set to 2 to 80 g/L. When the added amount of the tannin or tannic acid is less than 2 g/L, the adhesion to the plated surface may be insufficient, leading to a decrease in the work adhesion of the paint film. Further, when the added amount of the tannin or tannic acid exceeds 80 g/L, the cohesive force of the chemical treatment film may be insufficient, leading to a decrease in the work adhesion of the paint film.

Further, an acid, an alkali, or the like may be added to the chemical treatment agent for forming the chemical treatment film 203 in order to adjust pH within a range that does not impair the performance.

The chemical treatment agent containing various components as described above is applied to one side or both sides of the Zn—Al—Mg-based alloy plated steel sheet 10, and then dried to form the chemical treatment film layer 203. In the pre-coated steel sheet according to the present embodiment, it is preferable to form the chemical treatment film layer 203 of 10 to 1000 mg/m$^2$ per side on the Zn—Al—Mg-based alloy plated steel sheet. The weight of the chemical treatment film layer 203 is more preferably 20 to 800 mg/m$_2$, and most preferably 50 to 600 mg/m$^2$. Note that a film thickness (a thickness d2 in FIG. 2A and FIG. 2B) of the chemical treatment film layer 203 corresponding to such a weight is approximately 0.01 to 1 μm, depending on the components contained in the chemical treatment agent.

<Regarding Paint Film Layer 205>

The paint film layer 205 according to the present embodiment is a layer formed on the chemical treatment film layer 203 as described above. Such a paint film layer 205 is composed of a plurality of layers of the primer paint film layer and the upper paint film layer, as schematically illustrated in FIG. 2A and FIG. 2B.

Here, a paint film layer that is brought into contact with the chemical treatment film layer 203 in the paint film layer 205 is called a primer paint film layer. This primer paint film layer secures the adhesion between the entire paint film layer 205 and the chemical treatment film layer 203 and the corrosion resistance, and is placed as the most important factor that exerts an influence on the problems at elongated portion. On the other hand, the upper paint film layer being a paint film positioned above such a primer paint film layer is also called a top paint film, and is often provided to secure design through coloring, barrier properties, and other surface functionality. This upper paint film layer is placed as a factor related to physical properties as the entire paint film layer 205 exerting an influence on the problems at elongated portion.

Such a paint film layer 205 contains at least a resin. Moreover, it is preferable that such a paint film layer 205 further contains a pigment. In addition to these components, the paint film layer 205 may contain various additives such as a leveling agent, an antifoaming agent, a coloring agent, a viscosity modifier, and an ultraviolet absorber. Note that a painting solution for forming the paint film layer 205 is preferably obtained by dispersing or dissolving each of the above components in a solvent.

Hereinafter, preferred forms of the primer paint film layer and the upper paint film layer included in the paint film layer 205 according to the present embodiment will be explained in more detail.

[Primer Paint Film Layer]

The primer paint film layer according to the present embodiment is realized based on the design manual as explained previously. Such a primer paint film layer preferably contains a polyester-based resin having an average molecular weight of 19000 or more and a glass transition point Tg of less than 40° C., and a curing agent.

When the average molecular weight (more specifically, a number average molecular weight) of the polyester-based resin is less than 19000, the extensibility of the formed primer paint film layer becomes insufficient. As a result of this, when the paint film layer 205 is deformed, it is not possible to follow the deformation, and a large stress occurs in the paint film layer 205. By setting the average molecular weight of the polyester-based resin to 19000 or more, it becomes possible to follow the deformation occurred in the paint film layer 205, and thus it becomes possible to suppress the stress occurred in the paint film layer 205 to a small value. The average molecular weight of the polyester-based resin is more preferably 20000 or more, and still more preferably 23000 or more.

On the other hand, when the average molecular weight of the polyester-based resin exceeds 25000, it is not possible to make the cross-link density to be sufficiently high, resulting in that scuffing of the paint film easily occurs in some cases. Accordingly, the average molecular weight of the polyester-based resin is more preferably 25000 or less.

Note that the average molecular weight of the polyester-based resin can be measured by GPC (Gel Permeation Chromatography).

Further, when the glass transition point Tg of the polyester-based resin becomes 40° C. or more, the formed primer paint film layer becomes excessively hard, resulting in that a plastic deformation is likely to occur with respect to a strain. By setting the glass transition point Tg of the polyester-based resin to less than 40° C., it becomes possible to achieve a primer paint film layer having appropriate hardness. The glass transition point Tg of the polyester-based resin is more preferably 30° C. or less, and still more preferably 20° C. or less. On the other hand, when the glass transition point Tg of the polyester-based resin is less than 0° C., the corrosion resistance is sometimes lowered due to the insufficient cohesive force of the paint film. Therefore, the glass transition point Tg of the polyester-based resin is more preferably 0° C. or more.

Note that the glass transition point Tg of the polyester-based resin can be specified from a DTA curve obtained by executing a differential thermal analysis regarding a focused resin by using a differential scanning calorimeter.

Further, the primer paint film layer according to the present embodiment contains blocked isocyanate or blocked isocyanate resin as the curing agent. Since the primer paint film layer contains the blocked isocyanate or blocked isocyanate resin as the curing agent, the polyester-based resin can be cross-linked in an appropriate state, resulting in that high level of film ductility can be realized, and at the same time, it becomes possible to balance the film ductility with the adhesion and the hardness performance of the primer paint film layer.

As the above blocked isocyanate, there can be cited, for example, TDI (toluene diisocyanate), MDI (diphenylmethane diisocyanate), XDI (xylene diisocyanate), NDI (naphthylene diisocyanate), HDI (hexamethylene diisocyanate), IPDI (isophorone diisocyanate), hydrogenated MDI, hydrogenated XDI, and so on. It is possible to use any of the blocked isocyanates, but the use of at least any of the HDI, the IPDI, the hydrogenated MDI, and the hydrogenated XDI being an aliphatic compound or alicyclic compound is particularly preferable for the above-described purpose, since the cross-linking with relatively moderate and uniform reaction proceeds. Further, it is also possible to use a blocked isocyanate resin obtained by performing pre-polymerization on these blocked isocyanates as a raw material. In this case, it is possible to change the number of functional groups (the number of NCO groups) per molecule of the blocked isocyanate resin through resin design, so that it becomes possible to more easily control the paint film physical properties after curing.

Further, as a blocking agent of the blocked isocyanate or blocked isocyanate resin, it is possible to use c caprolactam, MEK oxime, benzotriazole, and the like, but the use of MEK oxime whose dissociation temperature is relatively low, is preferable for the above-described purpose.

Further, in the primer paint film layer according to the present embodiment, it is also possible to use, as the curing agent, one other than the blocked isocyanate or blocked isocyanate resin, as long as it satisfies at least any of the following: both conditions (a-1) and (a-2); a condition (b); and a condition (c), as will be explained below.

The primer paint film layer according to the present embodiment has the configuration as described above, and thus the formed primer paint film layer satisfies at least any of the first point and the second point as mentioned previously. As a result of this, the primer paint film layer according to the present embodiment satisfies at least any of the following: both the conditions (a-1) and (a-2); the condition (b); and the condition (c).

(a-1) A cut strength measured by cutting an interface between the paint film layer and a layer positioned on the steel sheet side relative to the paint film layer by the SAICAS method is 1.00 kN/m or more on average, 5% or less of a cut area is in the form of interfacial peeling, and the remaining cut area is in the form of cohesive failure within the paint film layer.

(a-2) When a portion where a thickness of the pre-coated plated steel sheet after being subjected to uniaxial elongation has decreased by 20% or more when compared to a thickness of a non-molded portion is cut by the SAICAS method, at an interface between the paint film layer and a layer positioned on the steel sheet side relative to the paint film layer (more specifically, an interface between the primer paint film layer and the chemical treatment film layer or the plating layer positioned on the steel sheet side relative to the primer paint film layer), a cut strength is 1.0 kN/m or more on average, 20% or less of a cut area is in the form of interfacial peeling, and the remaining cut area is in the form of cohesive failure within the paint film layer (more specifically, within the primer paint film layer).

(b) An indentation load when a microhardness measuring quadrangular pyramid-shaped indenter is inserted at a rate of 2 μm per minute with respect to a position 1 μm away in a direction of the primer paint film layer from an interface between the primer paint film layer and a layer positioned on the steel sheet side relative to the primer paint film layer, at a cross section obtained by cutting the primer paint film layer in a thickness direction, and the indenter reaches a depth of 10 μm, is less than 1000 mN.

(c) A load curve with respect to a displacement when a microhardness measuring quadrangular pyramid-shaped indenter is inserted at a rate of 10 μm per second to a depth of 10 μm with respect to a position 1 μm away in a direction of the primer paint film layer from an interface between the primer paint film layer and a layer positioned on the steel sheet side relative to the primer paint film layer, at a cross section obtained by cutting the primer paint film layer in the thickness direction, and then the indenter is unloaded at a rate of 2 μm per minute is drawn, and at a plane defined by the displacement and the load, an area of a range surrounded by a straight line corresponding to the displacement of 10 μm, a straight line corresponding to the load of 0, and the load curve when performing the unloading is less than 500 μm·mN.

Figure 3:
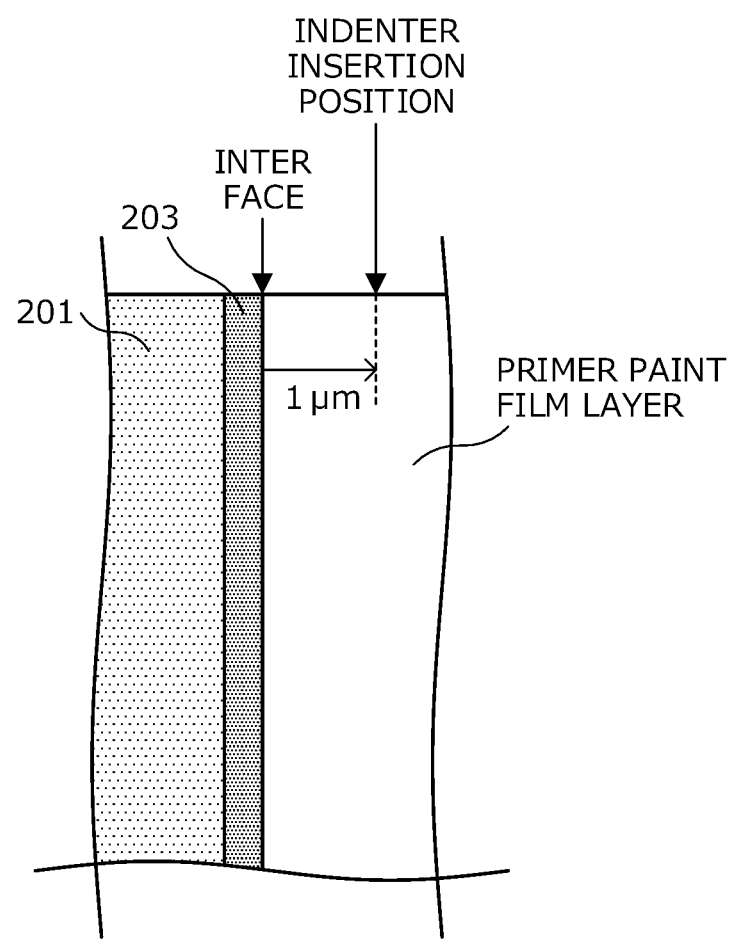
FIG. 3 is an explanatory view for explaining a measuring method using a microhardness measuring quadrangular pyramid-shaped indenter.

Note that "a position 1 μm away in a direction of the primer paint film layer from an interface between the primer paint film layer and a layer positioned on the steel sheet side relative to the primer paint film layer" in the above-described condition (b) and condition (c) can also be regarded as a position 1 μm away in a direction of an upper paint film layer from a lower end (an end portion on the steel sheet side) of the primer paint film layer, as schematically illustrated in FIG. 3.

Figure 4:
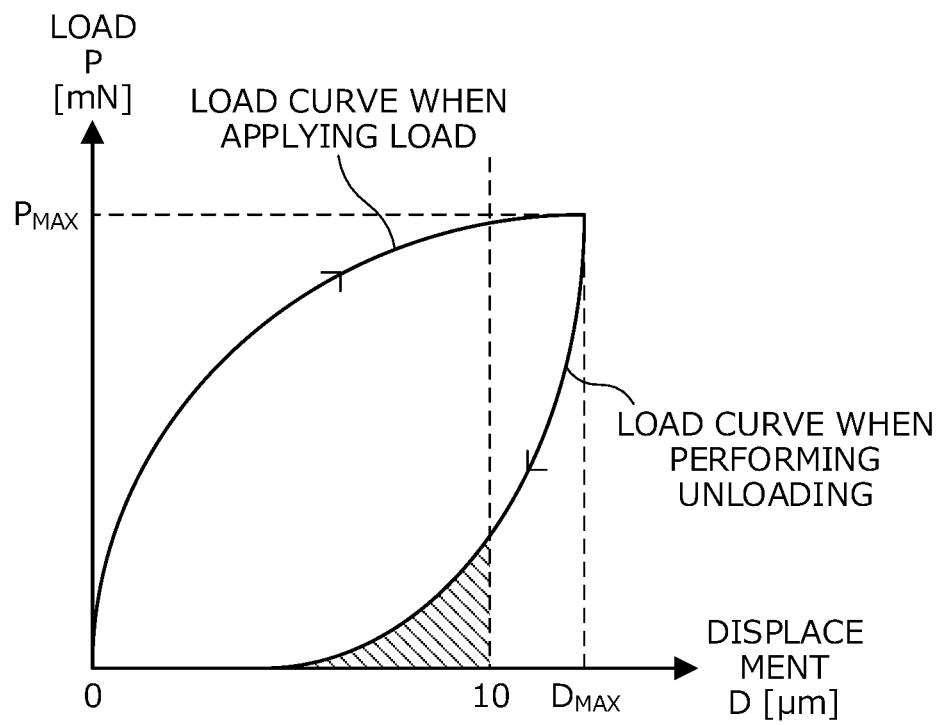
FIG. 4 is an explanatory view for explaining the measuring method using the microhardness measuring quadrangular pyramid-shaped indenter.

Further, as schematically illustrated in FIG. 4, the area in the condition (c) corresponds to an area of a diagonally shaded region in the drawing. Here, in a case of the primer paint film layer focused in the present embodiment, a maximum load $P_{MAX}$ generally becomes about 1000 to 2000 mN, and a displacement $D_{MAX}$ at the maximum load generally becomes greater than 10 μm. Such an area becomes an index of strain energy that remains in a focused resin when a strain is applied to the resin and then unloading is performed, and it can be considered that the larger such an area, the larger the energy (namely, a residual stress) that remains in the resin.

Here, the cut strength and the peel form of the primer paint film layer by the SAICAS method in the conditions (a-1) and (a-2), can be measured while performing cutting by using a measuring device that can utilize the SAICAS method (for example, DN-GS model manufactured by DAI-PLA WINTES CO., LTD.).

The cutting conditions for the SAICAS method are as follows.

A diamond blade (0.3 mm in width) is used as a cutting blade, and oblique cutting is performed in a constant speed mode with a horizontal velocity of 1 μm/sec. and a vertical velocity of 0.1 μm/sec. and then near the interface, the cutting is switched to only the horizontal movement to cut a length of 200 μm, and the average cut strength during the horizontal movement is measured. The depth position at which the cutting is switched to the horizontal movement is set by specifying the interface position (a position at the very limit where the plating is not cut) through a preliminary experiment. When the plated surface is cut due to the unevenness of the plating during the horizontal movement of the cutting blade, the cut strength can be discriminated because it momentarily increases abnormally. Such a case is excluded as an abnormal value, and the average cut strength is calculated. Note that the number of measurements n is set to 3, and the average value of the three values of the average cut strength is taken as the cut strength.

The method of measuring the ratio of the interfacial peel form and the cohesive failure form in the cut portion during horizontal movement is as follows.

Observation of the surface of the cut portion by the SAICAS method with an optical microscope makes it possible to clearly distinguish the difference in peel form for each portion. (A) When an extremely thin paint film remains on the cut portion, it is possible to determine that the peel form is thin-layer cohesive failure within the paint film because coloration due to the resin and pigment in the paint film is observed. (B) When the cut portion is interfacial peeling, the appearance of the plated surface of the base is observed. No strong reflection is seen even when such a portion is irradiated with light, resulting in a blackish appearance. Further, in the case of interfacial peeling, the fact that the cut strength by the SAICAS method decreases locally is also a determining factor. This is because although the moving position of the cutting blade is within the paint film immediately above the interface, interfacial peeling occurs as a result of the peeling position shifting to the interface because the adhesion force of the interface is lower than the cohesive force of the paint film. (C) When the cut portion is cohesive failure of the plating layer, a metallic luster is observed, and when such a portion is irradiated with light, the light is strongly reflected, resulting in that distinguishing from interfacial peeling is easy. Further, the fact that the cut strength by the SAICAS method increases locally is also a determining factor.

An optical micrograph of a horizontal cut range (having a size of 300 μm×200 μm) by the SAICAS method is taken, portions of the paint film cohesive failure, the interfacial peeling, and the plating layer cohesive failure within the same range are specified according to the above criteria, and areas of the portions are measured using image processing software or transparent graph paper. Subsequently, the ratio of the interfacial peeling area to the area excluding the plating layer cohesive failure is calculated from the horizontal cut range by the SAICAS method.

In the primer paint film layer according to the present embodiment, the content of such a curing agent is more preferably 5 to 15 mass % with respect to the total content of the polyester-based resin and the curing agent. When the curing agent is contained in such a content, the cross-linked state of the polyester-based resin can be set to more appropriate one. The content of the curing agent is still more preferably 8 to 12 mass % with respect to the total content of the polyester-based resin and the curing agent.

Further, when the number of substituents capable of reacting with OH groups in the polyester-based resin, in the blocked isocyanate or blocked isocyanate resin as the curing agent, is described as na, and the number of OH groups in the polyester-based resin is described as nb, the sum (na+nb) is preferably 5.5 or more and 8.0 or less. When such a condition is satisfied, it is possible to make the cross-linked state of the polyester-based resin to be still more appropriate one. The sum (na+nb) is more preferably 6.0 or more. Further, the sum (na+nb) is more preferably 7.5 or less.

By setting the conditions as described above, it is possible to make the resin that has low Tg and high molecular weight and spreads well to be sufficiently hardened without lowering the added amount of the cross-linking agent (specifically, without lowering the cross-link density), to form the paint film capable of dispersing the stress caused by the deformation thereof. As a result of this, it is possible to more easily improve the problems at elongated portion without lowering the paint film physical performance.

Note that the number of such substituents can be calculated as follows. Specifically, in a case of blocked isocyanate and diisocyanate, na is 2.0. Further, in a case of the blocked isocyanate resin, na can be calculated from a catalog value of the NCO content of the isocyanate used as the raw material and a molecular weight after pre-polymerization (measured by gel permeation chromatography). It is possible to calculate nb from a number average molecular weight and OH valences (each thereof is a catalog value) of the used polyester-based resin.

Further, it is more preferable that the primer paint film layer according to the present embodiment further contains, as the curing agent, melamine or melamine derivative in addition to the above-described blocked isocyanate. When the melamine or melamine derivative is further contained as the curing agent, the cross-linked state of the primer paint film layer can be made to a better one. As such melamine or melamine derivative, there can be cited, for example, methylated melamines represented by complete alkyl-type methylated melamine, methylol group-type methylated melamine, imino group-type methylated melamine, and the like, butylated melamines represented by complete alkyl-type butylated melamine, imino group-type butylated melamine, and the like, and mixed etherized melamines represented by complete alkyl-type mixed etherized melamine, methylol group-type mixed etherized melamine, imino group-type mixed etherized melamine, and the like. Further, by using the imino group-type methylated melamine, in particular, as the melamine or melamine derivative, the cross-linked state of the primer paint film layer becomes dense and highly uniform, and thus the cross-linked state can be further improved.

Here, the content of the melamine or melamine derivative is more preferably 20 to 60 mass % with respect to the total content of the blocked isocyanate or blocked isocyanate resin and the melamine or melamine derivative. When the melamine or melamine derivative is contained in such a content, the cross-linked state of the polyester-based resin can be set to more appropriate one. The content of the melamine or melamine derivative is still more preferably 30 to 50 mass % with respect to the total content of the blocked isocyanate or blocked isocyanate resin and the melamine or melamine derivative.

An appropriate base paint for the primer paint film may be selected according to the usage environment and application of the pre-coated plated steel sheet within a range that does not deviate from the range of the primer paint as described above. The base paint contains the polyester-based resin and the curing agent as described above, and can be used in any form such as an organic solvent-based form, water-based form, or powder-based form.

It is preferable that such a base paint further contains a rust preventive pigment (a chromate-free rust preventive pigment, in particular). As the chromate-free rust preventive pigment in the base paint, there can be used arbitrary one such as calcium ion-exchanged silica (commonly called calcium silicate in some cases), aluminum tripolyphosphate, phosphorus and vanadium pigment (PV pigment), zinc phosphate, iron phosphate, aluminum phosphate, calcium molybdate, aluminum molybdate, barium molybdate, vanadium oxide, water-dispersible silica, fumed silica, orthophosphoric acid, pyrophosphoric acid, metaphosphoric acid, hypophosphoric acid, phosphorous acid, hypophosphorous acid and salts thereof. The content of such a rust preventive pigment is preferably 20 to 60 mass %, for example, with respect to the solid content of the paint film. When the content of the rust preventive pigment is less than 20 mass %, in addition to the possibility that the effect of corrosion resistance cannot be sufficiently secured, the rigidity and cohesive force of the paint film decrease, resulting in that paint film peeling (paint film scuffing) is likely to occur in some cases when the surface of the paint film rubs against a mold during pressing of the painted plated steel sheet. Further, when the content of the rust preventive pigment exceeds 60 mass %, workability sometimes decreases. From the viewpoint of the balance among corrosion resistance, chemical resistance, and workability, the content of the rust preventive pigment is more preferably 30 to 55 mass %, and still more preferably 35 to 50 mass %.

The thickness of the primer paint film layer before molding is preferably 2 to 10 µm. When the thickness of the primer paint film layer is less than 2 µm, the functions such as corrosion resistance required as the pre-coated plated steel sheet may not be exhibited sufficiently. On the other hand, when the thickness of the primer paint film layer exceeds 10 µm, the workability of the paint film may decrease. The thickness of the primer paint film layer before molding is more preferably 3 to 8 µm, and still more preferably 4 to 6 µm.

After applying a primer paint component containing the components forming the primer paint film layer as described above, the primer paint component is baked at a temperature of 150° C. or more and less than 300° C. to be cured and dried. When the baking temperature is less than 150° C., adhesion may not be sufficiently secured, and when the baking temperature is 300° C. or more, thermal degradation of the resin component may occur, resulting in a decrease in the workability.

Note that the application of the primer paint component as described above can be performed by generally well-known coating methods such as roll coating, curtain flow coating, air spray, airless spray, immersion, bar coating, or brush coating, for example. In order to solve the above-described problems at elongated portion, it is advantageous to uniformly apply and dry the primer paint film layer, and it is preferable to perform roll coating or curtain flow coating for uniformly applying the primer paint film layer within the above-described film thickness range.

[Upper Paint Film Layer]

An appropriate base paint for the upper paint film layer may be selected according to the usage environment and application of the pre-coated plated steel sheet within a range that does not deviate from the range of the paint of the upper paint film defined in the present invention. As the type of resin for the base paint, generally well-known ones can be used. As such a resin, there can be cited, for example, a polyacrylic-based resin, a polyolefin-based resin, a polyurethane-based resin, an epoxy-based resin, a polyester-based resin, a polybutyral-based resin, a melamine-based resin, a silicon resin, a fluorocarbon resin, an acrylic resin, and so on, and these resins can be used as they are or in combination. Further, these resins can be cured with any curing agent. The base paint can be used in any form such as an organic solvent-based form, water-based form, or powder-based form. Note that the resin contained in the base paint of the upper paint film layer may be of the same type as or different from that contained in the base paint film of the primer paint film layer, but when considering the adhesion between the primer paint film layer and the upper paint film layer, the types of used resins are preferably the same between the layers.

For use applications with more demanding molding workability, the base paint preferably contains a high-molecular polyester resin and a curing agent. The high-molecular polyester resin can be selected according to the application of the pre-coated plated steel sheet, and any high-molecular polyester-based resin that is usually used as a solvent-based paint can also be used. Such a high-molecular polyester-based resin is preferably a high-molecular polyester resin in which the main resin is composed of ester bonds of two or more resin monomers.

As a curing agent used to form a thermosetting resin paint film by reaction with the above-described high-molecular polyester resin, it is possible to use, for example, an amino resin such as a melamine resin, a urea resin, or a benzoguanamine resin, or an isocyanate compound and its block. Regarding the mass ratio of the curing agent and the resin in the dry paint film, it is preferable that the amount of the curing agent is 10 to 35 parts by mass with respect to 100 parts by mass of the total amount of the resin and the curing agent. When the amount of the curing agent is less than 10 parts by mass, adhesion, corrosion resistance, solvent resistance, or the like may not be sufficiently secured, and when it exceeds 35 parts by mass, workability, chemical resistance, and impact resistance may decrease.

Further, the upper paint film layer can further contain additives such as a pigment, surface-modified metal powders or glass powders, a dispersing agent, a leveling agent, a wax, an aggregate, and fluorocarbon resin beads, a diluting solvent, and so on as needed.

Here, when the upper paint film layer further contains a pigment, a content of such a pigment is preferably 60% or less, for example, in terms of a pigment weight concentration (PWC).

In the paint film layer 205 according to the present embodiment, a total thickness of the primer paint film layer and the upper paint film layer described above, is preferably 10 to 30 µm. The total thickness of less than 10 µm is not preferable since cracks due to working become large, and besides, the corrosion resistance may decrease. The total thickness is more preferably 13 µm or more, and still more preferably 20 Inn or more. On the other hand, the total thickness of the primer paint film layer and the upper paint film layer exceeding 30 µm is not preferable since the residual stress during working becomes large, and deterioration of various performances at an elongated portion such as occurrence of blooming phenomenon may occur. The total thickness is more preferably 28 µm or less, and still more preferably 25 µm or less.

Here, the thickness of the primer paint film layer, and the total thickness of the primer paint film layer and the upper paint film layer according to the present embodiment, can be measured by observing a cross section of the paint film layer 205 according to the present embodiment with an optical microscope. More specifically, the pre-coated plated steel sheet including the focused paint film layer 205 is embedded in a thermosetting resin such as an epoxy resin, a cutting machine such as a precision cutter is used to cut the sample at a position to be observed, in a direction parallel to a thickness direction, and the obtained cross section is observed with the optical microscope. Shortest distances from arbitrary positions of a plurality of places (5 places, for example) on an interface between the embedded resin and the paint film layer to an interface between the paint film layer and a layer positioned on the steel sheet side relative to the paint film layer are measured (namely, the distances are measured in a direction perpendicular to the interfaces), and the obtained measured values are averaged. The average thickness of the paint film obtained as above can be set to the total thickness of the primer paint film layer and the upper paint film layer. The thickness of the primer paint film layer can also be measured in the same manner by measuring the shortest distance from an interface between the primer paint film layer and the upper paint film layer to an interface between the paint film layer and the layer positioned on the steel sheet side relative to the paint film layer.

After applying a paint component of the upper paint film layer, the paint component is baked at a temperature of 150° C. or more and less than 300° C. to be cured and dried. When the baking temperature is less than 150° C., adhesion of the paint film may not be sufficiently secured, and when the baking temperature is 300° C. or more, thermal degradation of the resin component such as a polyester resin component may occur, resulting in a decrease in the workability.

Note that the application of the paint for forming the upper paint film layer can be performed by generally well-known coating methods such as roll coating, curtain flow coating, air spray, airless spray, immersion, bar coating, or brush coating, for example. In order to solve the above-described problems at elongated portion, it is advantageous to uniformly apply and dry the upper paint film layer as well, in the same manner as the primer paint film layer, and it is preferable to perform roll coating or curtain flow coating for uniformly applying the upper paint film layer within the above-described film thickness range.

The pre-coated plated steel sheet 20 according to the present embodiment has been explained in detail above while referring to FIG. 2A to FIG. 4.

(Regarding Molded Product)

Figure 5:
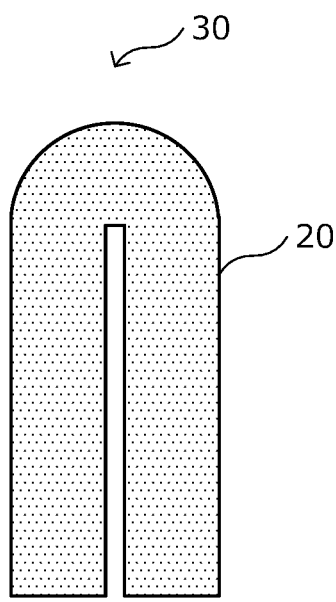
FIG. 5 is an explanatory view for explaining a molded product according to the same embodiment.

Next, a molded product using the pre-coated plated steel sheet 20 as explained above, will be explained in detail while referring to FIG. 5. FIG. 5 is an explanatory view schematically illustrating an example of a structure of a molded product according to the present embodiment.

As schematically illustrated in FIG. 5 as an example, a molded product 30 according to the present embodiment is one formed in a manner that the pre-coated plated steel sheet 20 as explained above is subjected to 0T bending to be molded into a desired shape.

Here, the average chemical composition of a plating layer included in the molded product 30 according to the present embodiment is the same as that of the plating layer 201 included in the pre-coated plated steel sheet 20 serving as a base. Accordingly, the average chemical composition of the plating layer included in the molded product 30 contains, for example, aluminum of 0.5 to 60.0 mass % and magnesium of 0.5 to 15.0 mass %. Of the plating layers, the plating layer included in the molded product 30 according to the present embodiment preferably contains aluminum of 5 mass % or more and 15 mass % or less, and magnesium of 2 mass % or more and 4 mass % or less. The plating layer of the molded product 30 contains aluminum and magnesium in the above-described contents, thereby making it possible to further improve desired corrosion resistance. Note that in the plating layer in the molded product 30, the balance other than the above-described aluminum and magnesium is elements derived from the external environment, zinc, and impurities.

As a concrete shape of the molded product 30 according to the present embodiment, there can be cited various shapes that various parts have, including articles mainly used outdoors such as air conditioner outdoor units and water heaters, for example.

A working method used for working the pre-coated plated steel sheet according to the present embodiment to form a molded product is not particularly limited, and conditions for the working may also be appropriately set according to the working method to be used, the shape of the molded product, and so on.

When manufacturing the molded product as described above, it can be said that the 0T bending is a severe molding work for the pre-coated plated steel sheet 20. By such 0T bending, the vicinity of a vertex portion of the bent portion corresponds to an elongated portion. When a general pre-coated plated steel sheet is used, paint film peeling frequently occurs in such a vertex portion.

However, when the pre-coated plated steel sheet 20 according to the present embodiment is used as a material, the stress of the paint film due to working is not large because of the physical properties of the paint film, and further, the cohesive force of the primer paint film layer is also sufficient, so that it becomes possible to more securely inhibit the occurrence of paint film peeling in the elongated portion.

[Regarding Measured Values by SAICAS Method>

In the molded product formed of the pre-coated plated steel sheet according to the present embodiment, the cut strength obtained by measuring a specific portion by the SAICAS method, and the peel state of this portion are specified.

In the molded product according to the present embodiment, which is schematically illustrated in FIG. 5 as an example, a portion where the thickness of the pre-coated plated steel sheet of the molded product has decreased by 20% or more (a portion where the relationship of $(d-d')/d \geq 0.20$ is satisfied when the thickness is set to d') when compared to a thickness d of the pre-coated plated steel sheet before molding (which can also be regarded as a non-molded portion), is a portion where the plated steel sheet is compressed and elongated by working, and the elongation exceeds the compression. Hereinafter, such a portion where the thickness has decreased by 20% or more will be referred to as a "decreased portion." Such a decreased portion is a portion where the paint film peeling is likely to occur in the molded product.

In the portion, in the molded product according to the present embodiment, where the thickness of the pre-coated plated steel sheet has decreased by 20% or more when compared to that before molding (namely, the elongated portion), the cut strength between the chemical treatment film layer and the paint film layer (more specifically, the primer paint film layer) is 1.00 kN/m or more on average when measured by the SAICAS method. In addition, when such an elongated portion is cut by the SAICAS method, 20% or less of a cut area is in the form of interfacial peeling, and the remaining cut area is in the form of cohesive failure within the paint film layer (more specifically, within the primer paint film layer). When the elongated portion does not satisfy all of the above-described conditions regarding the cut strength and the peeling area, the chemical treatment film is destroyed by working with elongation, resulting in a decrease in the adhesion. In addition, an internal stress of the paint film concentrates on the interface between the chemical treatment film layer and the paint film layer (more specifically, the primer paint film layer) or the interface between the chemical treatment film layer and the plating layer, resulting in that the paint film adhesion during elongation is insufficient at the portion with the lowest adhesion strength, causing the paint film peeling. Besides, when the cut strength measured by the SAICAS method does not reach 1.00 kN/m on average, even if a sufficient area is in the form of cohesive failure within the paint film layer (more specifically, within the primer paint film layer), the cohesive force of the primer paint film layer is insufficient, resulting in that the paint film peeling due to the cohesive failure of the primer paint film layer occurs.

Note that if the thickness of the pre-coated plated steel sheet in the molded product has decreased by 20% or more when compared to that before molding, no significant difference due to the difference in % is observed in the measurement results by the SAICAS method.

In the molded product according to the present embodiment, the above-described cut strength according to the SAICAS method is preferably an average of 1.10 kN/m or more, and more preferably 1.20 kN/m or more. Note that such a cut strength is preferably as high as possible, but substantially, an upper limit thereof is about 1.30 kN/m.

Further, regarding the cut area of the elongated portion of the molded product according to the present embodiment by the SAICAS method, the ratio of the portion that is in the form of interfacial peeling is preferably 15% or less, and more preferably 10% or less. Note that the ratio of the portion that is in the form of interfacial peeling is preferably as small as possible, and its lower limit value is 0%.

[Method of Measuring Cut Strength and Peel Form by SAICAS Method]

The cut strength and the peel form by the SAICAS method for the focused molded product using the pre-coated plated steel sheet are measured as follows.

First, three or more flat portions of the focused molded product, which are considered to be non-molded portions, are specified, and the total thickness of each of the flat portions (including the plated steel sheet of the base, and the paint films on the front and back surfaces) is measured three times with a microgauge, to calculate the average value of the measured thicknesses. Such measurements are performed at a plurality of specified positions, and an average value at each of the positions is further calculated. The average value of the obtained values at the plurality of positions is set to the thickness d of the pre-coated plated steel sheet before molding in the focused molded product.

Further, a measurement sample (having a size of roughly 20 mm×20 mm or more) is cut out from a portion that seems to have been subjected to various moldings such as uniaxial elongation, and is smoothed with a steel plate straightener (leveler). Regarding the obtained measurement sample, the total thickness (including the plated steel sheet of the base, and the paint films on the front and back surfaces) is measured with a microgauge, and the decrease ratio is calculated based on the obtained measured value and the thickness of the pre-coated plated steel sheet before molding, which is obtained as described above. The portion exhibiting a value of 20% or more in terms of the decrease ratio obtained in this manner is defined as the elongated portion of the molded product.

The cut strength and the peel form of the paint film at the interface between the paint film layer and the layer positioned on the steel sheet side relative to the paint film layer are measured by cutting the elongated portion specified as above while using a measuring device that can utilize the SAICAS method (for example, DN-GS model manufactured by DAIPLA WINTES CO., LTD.).

Further, even with an unworked pre-coated plated steel sheet, it is possible to obtain a portion whose thickness has decreased by 20% or more when compared to that before molding, by performing elongation. A pre-coated plated steel sheet cut in a strip shape (40×200 mm, for example) is elongated in a uniaxial direction by a tensile tester until when the most elongated portion is elongated to approximately 60%, and the steel sheet in the vicinity of the most elongated portion is cut out in a sufficient size (roughly 20×20 mm or more). Of this steel sheet piece, a portion whose thickness has decreased by 20% or more when compared to that before molding is specified (a specification method will be described later), and the cut strength and the peel form of the paint film at that portion are measured by the SAICAS method. The cutting direction is set to a direction perpendicular to the tensile direction of the steel sheet.

The decrease ratio when comparing the thickness of the plated steel sheet of the molded product with that before molding, is measured in the following manner. The total thickness (including the plated steel sheet of the base, and the paint films on the front and back surfaces) at each position within the steel sheet piece cut out from the molded product is measured with a microgauge, to thereby calculate the decrease ratio from the total thickness (including the plated steel sheet of the base, and the paint films on the front and back surfaces) of the pre-coated plated steel sheet before molding. Note that it is possible to confirm that there is no difference in the value of the ratio calculated by this method, as compared to the value calculated from the thickness of the base measured in a state where paint films are removed from the front and back surfaces of the pre-coated plated steel sheets before and after molding with a paint film remover.

Note that it is possible to confirm that there is no difference in the value of the decrease ratio calculated by the above method, as compared to the value calculated from the thickness of the base measured in a state where pre-coated plated steel sheets before and after molding are prepared, and paint films are removed from the front and back surfaces of the pre-coated plated steel sheets before and after molding with a paint film remover.

The cut condition by the SAICAS method, and the method of measuring the ratio of the interfacial peel form and the cohesive failure form in the cut portion are as explained previously, and thus detailed explanation thereof will be omitted below.

The molded product according to the present embodiment has been explained in detail above with reference to FIG. 5.

As explained above, according to the embodiment of the present invention, by using the plated steel sheet for pre-coated steel sheet according to the embodiment of the present invention, it is possible to obtain the molded product in which cracks do not occur in the paint film even being subjected to the 0T bending, peeling does not occur in the paint film at the 0T bent portion with time or by heating, and further, excellent corrosion resistance regarding corrosion under paint film at the 0T bent portion and a periphery thereof is provided, even in a case where the Zn—Al—Mg-based alloy plated steel sheet is used as the base sheet.

EXAMPLE

Hereinafter, the pre-coated plated steel sheet and the molded product according to the present invention will be concretely explained while describing examples and comparative examples. Note that the examples to be described below are merely examples of the pre-coated plated steel sheet and the molded product according to the present invention, and the pre-coated plated steel sheet and the molded product according to the present invention are not limited to the following examples.

Test Example 1

(1. Plated Steel Sheet Used as Base Sheet)

As the base sheets of the pre-coated steel sheet, the following four types of zinc-based plated steel sheets were used. Plating layers of the following zinc-based plated steel sheets were subjected to spray treatment for seconds with a commercially-available sodium orthosilicate-based alkali washing liquid, and then subjected to water washing and drying.

G-A: Zn-11% Al-3% Mg-0.2% Si hot-dip zinc alloy plated steel sheet (sheet thickness 0.60 mm, plating weight 40 g/m$^2$)

G-B: Zn-1% Al-1% Mg hot-dip zinc alloy plated steel sheet (sheet thickness 0.60 mm, plating weight 40 g/m$^2$)

G-C: Zn-6% Al-3% Mg hot-dip zinc alloy plated steel sheet (sheet thickness 0.60 mm, plating weight 40 g/m$^2$)

G-D: Zn-55% Al-2% Mg-1.6% Si hot-dip zinc alloy plated steel sheet (sheet thickness 0.35 mm, plating weight 75 g/m$^2$)

(2. Film Formation of Chemical Treatment Film Layer)

As a painting component intended for forming the chemical treatment film layer, the following was used. Note that an added amount of each component in each of the painting components was adjusted to fall within the range of the added amount explained previously.

S1: Water-based painting component composed of tannic acid, silane coupling agent, fine silica particles, and polyester resin S2: Water-based painting component composed of silane coupling agent, phosphate, and acrylic resin S3: Water-based painting component composed of silane coupling agent, fluorotitanic acid, fluorozirconic acid, and urethane resin The above-described painting components S1 to S3 were bar-coated on the above-described plated steel sheets for pre-coated steel sheet so as to have a predetermined weight when dried, and then dried in an air-heating furnace at a metal surface reached temperature of 70° C. and air-dried.

(3-1. Film Formation of Primer Paint Film Layer)

As a painting component intended for forming the primer paint film, there were prepared primer paints obtained by variously changing the types and compounding ratios of the polyester-based resin, the curing agent, and the rust preventive pigment, as described in Table 1-1 and Table 1-2.

<Polyester-Based Resin>

Polyester resin (number average molecular weight: 6000, Tg: 50° C.)

Polyester resin (number average molecular weight: 8000, Tg: 5° C.)

Polyester resin (number average molecular weight: 15000, Tg: 5° C.)

Polyester resin (number average molecular weight: 19000, Tg: 5° C.)

Polyester resin (number average molecular weight: 20000, Tg: 15° C.)

Polyester resin (number average molecular weight: 20000, Tg: 35° C.)

Polyester resin (number average molecular weight: 23000, Tg: 5° C.)

Polyester resin (number average molecular weight: 25000, Tg: 5° C.)

Polyester resin (number average molecular weight: 30000, Tg: 5° C.)

<Curing Agent>

BI-A: MEK oxime blocked HDI

BI-B: ε caprolactam blocked MDI

MF-A: Methylated melamine

MF-B: Butylated melamine

<Rust Preventive Pigment>
Compounded Product of Equal Mass of Calcium Ion-Exchanged Silica and Aluminum Tripolyphosphate The primer paints having the components as described in Table 1-1 and Table 1-2 below were used and bar-coated on the plated steel sheets after being subjected to the above-described chemical treatment so as to have a thickness when dried as described in Table 1-1 and Table 1-2, and then dried in an air-heating furnace at a metal surface reached temperature of 215° C.

(3-2. Film Formation of Upper Paint Film Layer)

As a painting component intended for forming the upper paint film layer, the following was used.

T-A: High-molecular polyester/melamine resin curing system composition (FLC7000 manufactured by Nippon Paint Co., Ltd.)

T-B: Polyester/melamine resin curing system composition (FLC7100 manufactured by Nippon Paint Co., Ltd.)

The above-described T-A or T-B was bar-coated on the layer having the above-described primer paint film formed thereon, so as to have a total thickness when dried as described in Table 1-1 and Table 1-2, and then dried in an air-heating furnace at a metal surface reached temperature of 230° C.

(4-1. State of Paint Film in Unworked Condition)

The state of the paint film of each of the pre-coated plated steel sheets manufactured by the above-described method was checked by SAICAS and indenter insertion.

(1) SAICAS

The interface between the chemical treatment film layer and the primer paint film layer or the interface between the chemical treatment film layer and the plating layer of the pre-coated plated steel sheet was cut by the SAICAS method to measure the cut strength and the peel form. Note that the device used for the SAICAS method is DN-GS model manufactured by DAIPLA WINTES CO., LTD.

<Cut Strength>

A diamond blade (0.3 mm in width) was used, and oblique cutting was performed in a constant speed mode with a horizontal velocity of 1 μm/second and a vertical velocity of 0.1 μm/second and then near the interface, the cutting was switched to only the horizontal movement to cut a length of 200 μm, and the average cut strength during the horizontal movement was measured. The depth position at which the cutting was switched to horizontal movement was set by specifying the interface position (a position at the very limit where the plating layer is not cut) through a preliminary experiment. When the plated surface is cut due to the unevenness of the plating during the horizontal movement of the cutting blade, the cut strength can be discriminated because it momentarily increases abnormally. Such a case was excluded as an abnormal value, and the average cut strength was calculated. In each case, the number of measurements was set to n=3, and the average value of the three values of the average cut strength was taken as the cut strength.

A case where the obtained cut strength was 1.00 kN/m or more was evaluated as a score "A", and a case where the obtained cut strength was less than 1.00 kN/m was evaluated as a score "B".

<Peel Form>

An optical micrograph of a horizontal cut range (300×200 μm) by SAICAS was taken, portions of the primer cohesive failure, the interfacial peeling, and the plating cohesive failure within the same range were specified according to the above criteria, and areas of the portions were measured using transparent graph paper. Subsequently, the ratio of the interfacial peeling area to the area excluding the plating cohesive failure was calculated from the horizontal cut range by SAICAS.

A case where the obtained ratio was 5% or less was evaluated as a score "A", and a case where the obtained ratio was greater than 5% was evaluated as a score "B".

(2) Indenter Insertion

A microhardness measuring quadrangular pyramid-shaped indenter was used to perform measurement regarding the indentation load and the elastic strain energy corresponding value.

<Indentation Load and Elastic Strain Energy Corresponding Value>

A load when a microhardness measuring quadrangular pyramid-shaped indenter was inserted at a rate of 2 μm per minute with respect to a position 1 μm away in a direction of the primer paint film layer from an interface between the primer paint film layer and the chemical treatment film layer or an interface between the primer paint film layer and the plating layer, at a cross section obtained by cutting the primer paint film layer in the thickness direction, and the indenter reached a depth of 10 μm was measured, and a value of the load was set to the indentation load. After that, a load curve with respect to a displacement when the indenter was unloaded at a rate of 2 μm per minute was measured subsequently. The obtained load curve was used to calculate, at a plane defined by the displacement and the load, an area of a range surrounded by a straight line corresponding to the displacement of 10 μm, a straight line corresponding to the load of 0, and the load curve when performing the unloading, and the resultant was set to the elastic strain energy corresponding value.

(4-2. State of Paint Film after Molding (Soundness))

As described above, an interface between the chemical treatment film layer and the primer paint film layer or an interface between the chemical treatment film layer and the plating layer of a portion of the pre-coated plated steel sheet after being subjected to molding and whose film thickness has decreased by 20% or more (including one produced by uniaxial elongation), was cut by the SAICAS method to measure its cut strength and peel form.

<Cut Strength>

A diamond blade (0.3 mm in width) was used, and oblique cutting was performed in a constant speed mode with a horizontal velocity of 1 μm/second and a vertical velocity of 0.1 μm/second and then near the interface, the cutting was switched to only the horizontal movement to cut a length of 200 μm, and the average cut strength during the horizontal movement was measured. The depth position at which the cutting was switched to horizontal movement was set by specifying the interface position (a position at the very limit where the plating layer is not cut) through a preliminary experiment. When the plated surface is cut due to the unevenness of the plating during the horizontal movement of the cutting blade, the cut strength can be discriminated because it momentarily increases abnormally. Such a case was excluded as an abnormal value, and the average cut strength was calculated. In each case, the number of measurements was set to n=3, and the average value of the three values of the average cut strength was taken as the cut strength.

A case where the obtained cut strength was 1.10 kN/m or more was evaluated as a score "Al", a case where the obtained cut strength was 1.00 kN/m or more and less than 1.10 kN/m was evaluated as a score "A2", and a case where the obtained cut strength was less than 1.00 kN/m was evaluated as a score "B".

<Peel Form>

An optical micrograph of a horizontal cut range (300×200 μm) by SAICAS was taken, portions of the primer cohesive failure, the interfacial peeling, and the plating cohesive failure within the same range were specified according to the above criteria, and areas of the portions were measured using transparent graph paper. Subsequently, the ratio of the interfacial peeling area to the area excluding the plating cohesive failure was calculated from the horizontal cut range by SAICAS.

A case where the obtained ratio was 15% or less was evaluated as a score "A1", a case where the obtained ratio was greater than 15% and 20% or less was evaluated as a score "A2", and a case where the obtained ratio was greater than 20% was evaluated as a score "B".

(5. Performance Evaluation)

The performance at the elongated portion of each of the pre-coated plated steel sheets manufactured by the above-described method was evaluated by the following methods.

(1) 0T Bent Portion

The pre-coated plated steel sheets were subjected to 0T bending at 20° C., and the following evaluations were conducted.

<Presence or Absence of Cracks>

Observation was performed with a loupe of 10 magnifications, and the pre-coated plated steel sheet with no cracks observed in the paint film was evaluated as a score "A1", the pre-coated plated steel sheet having cracks observed in the paint film but the number of cracks was 1 or less per 1 cm was evaluated as a score "A2", and the pre-coated plated steel sheet in which cracks greater than the above were observed was evaluated as a score "B".

<Tape Peel Test>

When an adhesive tape (product name: scotch tape (registered trademark)) was attached to the 0T bent portion and then rapidly peeled off, the pre-coated plated steel sheet in which the paint film peeling thereof was not observed at all was evaluated as a score "A1", the pre-coated plated steel sheet in which the paint film peeling was observed but a peeling area was 5% or less was evaluated as a score "A2", and the pre-coated plated steel sheet in which the paint film peeling greater than the above was observed was evaluated as a score "B".

<Peeling Due to Immersion in Boiling Water (Blooming)>

After immersing the pre-coated plated steel sheets after being subjected to 0T bending in boiling water for 1 hour, the steel sheets were dried at room temperature, and the worked portions were observed with a loupe of 10 magnifications.

The pre-coated plated steel sheet in which no cracks were observed in the paint film or the state of cracks did not change at all when compared to the state before the immersion in boiling water, was evaluated as a score "A1", the pre-coated plated steel sheet in which the proceeding of the paint film peeling from cracks or the occurrence of new cracks in the paint film was observed due to the immersion in boiling water, but the number of cracks was 1 or less per 1 cm, was evaluated as a score "A2", and the pre-coated plated steel sheet in which the paint film peeling from cracks proceeded due to the immersion in boiling water or cracks in the paint film that had not been seen before the immersion in boiling water were observed after the immersion in boiling water was evaluated as a score "B".

<Corrosion Resistance in Salt Spray Test (SST)>

Each of the pre-coated plated steel sheets after being subjected to 0T bending was placed for 480 hours in a salt spray apparatus so that the 0T bent portion was directed upward, and then the following three types of evaluations were conducted.

Rust in Vertex Portion

The pre-coated plated steel sheet in which the occurrence of white rust or red rust in a curvature portion (referred to as a vertex portion) of the 0T bent portion was not observed at all, was evaluated as a score "A1", the pre-coated plated steel sheet in which the occurrence of white rust or red rust was observed but an occurrence area of the rust was 5% or less was evaluated as a score "A2", and the pre-coated plated steel sheet in which the occurrence of white rust or red rust greater than the above was observed was evaluated as a score "B".

Blister in Vertex Portion

The pre-coated plated steel sheet in which the occurrence of paint film blister in a curvature portion (referred to as a vertex portion) of the 0T bent portion was not observed at all, was evaluated as a score "A1", the pre-coated plated steel sheet in which the paint film blister was observed but an area of the paint film blister was 5% or less was evaluated as a score "A2", and the pre-coated plated steel sheet in which the occurrence of paint film blister greater than the above was observed was evaluated as a score "B".

Blister from Bent Portion to Plane Portion

A paint film blister from a curvature portion (referred to as a vertex portion) of the 0T bent portion to a plane portion was observed with a loupe of 10 magnifications. The pre-coated plated steel sheet in which the maximum blister width at the plane portion was 0.2 mm or less was evaluated as a score "A1", the pre-coated plated steel sheet in which the maximum blister width was greater than 0.2 mm and 0.5 mm or less was evaluated as a score "A2", and the pre-coated plated steel sheet in which the maximum blister width was greater than 0.5 mm was evaluated as a score "B".

(2) 7 mm-Erichsen Extruded Portion

Each of the pre-coated plated steel sheets was subjected to 7 mm-Erichsen extrusion at 20° C., and the following evaluations were conducted.

<Presence or Absence of Cracks>

Observation was performed with a loupe of 10 magnifications, and the pre-coated plated steel sheet with no cracks observed in the paint film at the Erichsen worked portion was evaluated as a score "A1", the pre-coated plated steel sheet having cracks observed in the paint film but the number of cracks was 10 or less was evaluated as a score "A2", and the pre-coated plated steel sheet in which cracks greater than the above were observed was evaluated as a score "B".

<Tape Peel Test>

When an adhesive tape (product name: scotch tape (registered trademark)) was attached to the Erichsen worked portion and then rapidly peeled off, the pre-coated plated steel sheet in which the paint film peeling thereof was not observed at all was evaluated as a score "A1", the pre-coated plated steel sheet in which the paint film peeling was observed but a peeling area was 5% or less was evaluated as a score "A2", and the pre-coated plated steel sheet in which the paint film peeling greater than the above was observed was evaluated as a score "B".

<Corrosion Resistance in Salt Spray Test (SST)>

Each of the pre-coated plated steel sheets after being subjected to Erichsen working was placed for 480 hours in a salt spray apparatus so that the Erichsen-worked projecting portion was directed upward, and then the following two types of evaluations were conducted.

Rust in Worked Portion

The pre-coated plated steel sheet in which the occurrence of white rust or red rust in the Erichsen worked portion was not observed at all, was evaluated as a score "A1", the pre-coated plated steel sheet in which the occurrence of white rust or red rust was observed but an occurrence area of the rust was 5% or less was evaluated as a score "A2", and the pre-coated plated steel sheet in which the occurrence of white rust or red rust greater than the above was observed was evaluated as a score "B".

Blister in Worked Portion

The pre-coated plated steel sheet in which the occurrence of paint film blister in the Erichsen worked portion was not observed at all, was evaluated as a score "A1", the pre-coated plated steel sheet in which the paint film blister was observed but an area of the paint film blister was 5% or less was evaluated as a score "A2", and the pre-coated plated steel sheet in which the occurrence of paint film blister greater than the above was observed was evaluated as a score "B".

Note that the 0T bending and the evaluation thereof were based on the method described in JIS K5400. Further, the 7 mm-Erichsen extrusion and the evaluation thereof were based on the method described in JIS K5400 by using a tester described in JIS B 7729. Further, the salt spray test (SST) was performed based on the method described in JIS Z2371.

The obtained results are collectively described in Table 1-1 and Table 1-2 below.

TABLE 1-1

| No. | CONFIGURATION PRE-COATED METAL SHEET ||||||||||||| STATE OF PAINT FILM IN UNWORKED CONDITION |||
|---|---|---|---|---|---|---|---|---|---|---|---|---|---|---|---|---|
| | BASE SHEET PLAT- ING | CHEMICAL TREAT- MENT FILM | PRIMER PAINT FILM LAYER |||||||| UPPER PAINT FILM LAYER || TOTAL THICK- NESS (μm) | SAICAS (a-1) || INTER FACIAL PEEL- ING (%) |
| | | | POLYESTER- BASED RESIN || CURING AGENT || RATIO OF CURING AGENT ||| THICK- NESS (μm) | PAINT TYPE | THICK- NESS (μm) | | CUT STRENGTH (kN/m) | |
| | | | NUMBER AVERAGE MOLEC- ULAR WEIGHT (Mn) | Tg (°C.) | BI | MF | MF/ (BI + MF) | CURING AGENT/ (RESIN + CURING AGENT) (MASS %) | PIGMENT CONCEN- TRATION (PWC) (MASS %) | | | | | | |
| EXAMPLE 1 | G-A | S1 | 30000 | 5 | BI-A | MF-A | 50 | 10 | 50 | 5 | T-A | 18 | 23 | A | A |
| EXAMPLE 2 | G-A | S1 | 25000 | 5 | BI-A | MF-A | 50 | 10 | 50 | 5 | T-A | 18 | 23 | A | A |
| EXAMPLE 3 | G-A | S1 | 23000 | 5 | BI-A | MF-A | 50 | 10 | 50 | 5 | T-A | 18 | 23 | A | A |
| EXAMPLE 4 | G-A | S1 | 19000 | 5 | BI-A | MF-A | 50 | 10 | 50 | 5 | T-A | 18 | 23 | A | A |
| COMPARATIVE EXAMPLE 1 | G-A | S1 | 15000 | 5 | BI-A | MF-A | 50 | 10 | 50 | 5 | T-A | 18 | 23 | A | A |
| COMPARATIVE EXAMPLE 2 | G-A | S1 | 8000 | 5 | BI-A | MF-A | 50 | 10 | 50 | 5 | T-A | 18 | 23 | A | A |
| EXAMPLE 5 | G-A | S1 | 20000 | 15 | BI-A | MF-A | 50 | 10 | 50 | 5 | T-A | 18 | 23 | A | A |
| EXAMPLE 6 | G-A | S1 | 20000 | 35 | BI-A | MF-A | 50 | 10 | 50 | 5 | T-A | 18 | 23 | A | A |
| COMPARATIVE EXAMPLE 3 | G-A | S1 | 6000 | 50 | BI-A | MF-A | 50 | 10 | 50 | 5 | T-A | 18 | 23 | A | A |
| EXAMPLE 7 | G-A | S1 | 23000 | 5 | BI-B | MF-A | 50 | 10 | 50 | 5 | T-A | 18 | 23 | A | A |
| EXAMPLE 8 | G-A | S1 | 23000 | 5 | BI-A | MF-B | 50 | 10 | 50 | 5 | T-A | 18 | 23 | A | A |
| EXAMPLE 9 | G-A | S1 | 23000 | 5 | BI-A | MF-A | 70 | 10 | 50 | 5 | T-A | 18 | 23 | A | A |
| EXAMPLE 10 | G-A | S1 | 23000 | 5 | BI-A | MF-A | 20 | 10 | 50 | 5 | T-A | 18 | 23 | A | A |
| EXAMPLE 11 | G-A | S1 | 23000 | 5 | BI-A | MF-A | 10 | 10 | 50 | 5 | T-A | 18 | 23 | B | A |
| EXAMPLE 12 | G-A | S1 | 23000 | 5 | BI-A | MF-A | 0 | 10 | 50 | 5 | T-A | 18 | 23 | B | A |
| EXAMPLE 13 | G-A | S1 | 23000 | 5 | BI-A | MF-A | 50 | 3 | 50 | 5 | T-A | 18 | 23 | B | A |
| EXAMPLE 14 | G-A | S1 | 23000 | 5 | BI-A | MF-A | 50 | 5 | 50 | 5 | T-A | 18 | 23 | A | A |
| EXAMPLE 15 | G-A | S1 | 23000 | 5 | BI-A | MF-A | 50 | 15 | 50 | 5 | T-A | 18 | 23 | A | A |
| EXAMPLE 16 | G-A | S1 | 23000 | 5 | BI-A | MF-A | 50 | 20 | 50 | 5 | T-A | 18 | 23 | A | A |
| EXAMPLE 17 | G-A | S1 | 23000 | 5 | BI-A | MF-A | 50 | 10 | 30 | 5 | T-A | 18 | 23 | A | A |
| EXAMPLE 18 | G-A | S1 | 23000 | 5 | BI-A | MF-A | 50 | 10 | 35 | 5 | T-A | 18 | 23 | A | A |
| EXAMPLE 19 | GA | S1 | 23000 | 5 | BI-A | MF-A | 50 | 10 | 55 | 5 | T-A | 18 | 23 | A | A |
| EXAMPLE 20 | G-A | S1 | 23000 | 5 | BI-A | MF-A | 50 | 10 | 60 | 5 | T-A | 18 | 23 | B | A |
| COMPARATIVE EXAMPLE 4 | G-A | S1 | 23000 | 5 | BI-A | MF-A | 50 | 10 | 50 | 1 | T-A | 18 | 19 | A | A |
| EXAMPLE 21 | G-A | S1 | 23000 | 5 | BI-A | MF-A | 50 | 10 | 50 | 2 | T-A | 18 | 20 | A | A |
| EXAMPLE 22 | G-A | S1 | 23000 | 5 | BI-A | MF-A | 50 | 10 | 50 | 10 | T-A | 18 | 28 | A | A |
| EXAMPLE 23 | G-A | S1 | 23000 | 5 | BI-A | MF-A | 50 | 10 | 50 | 12 | T-A | 18 | 30 | A | A |
| EXAMPLE 24 | G-A | S1 | 23000 | 5 | BI-A | MF-A | 50 | 10 | 50 | 2 | T-A | 21 | 23 | A | A |
| EXAMPLE 25 | G-A | S1 | 23000 | 5 | BI-A | MF-A | 50 | 10 | 50 | 10 | T-A | 13 | 23 | A | A |

TABLE 1-1-continued

| | | | | | | | | | | | | | | | | |
|---|---|---|---|---|---|---|---|---|---|---|---|---|---|---|---|---|
| EXAMPLE 26 | G-A | S1 | 23000 | 5 | BI-A | A1 | MF-A | 50 | 10 | 50 | 2 | T-A | 6 | 8 | A | A |
| EXAMPLE 27 | G-A | S1 | 23000 | 5 | BI-A | A1 | MF-A | 50 | 10 | 50 | 2 | T-A | 8 | 10 | A | A |
| COMPARATIVE EXAMPLE 7 | G-A | S1 | 23000 | | BI-A | A1 | MF-A | 50 | 10 | 50 | 10 | T-A | 25 | 35 | A | A |
| EXAMPLE 28 | G-A | S1 | 30000 | 5 | BI-A | A1 | MF-A | 50 | 10 | 50 | 5 | T-B | 18 | 23 | A | A |
| EXAMPLE 29 | G-A | S1 | 25000 | 5 | BI-A | A1 | MF-A | 50 | 10 | 50 | 5 | T-B | 18 | 23 | A | A |
| EXAMPLE 30 | G-A | S1 | 23000 | 5 | BI-A | A1 | MF-A | 50 | 10 | 50 | 5 | T-B | 18 | 23 | A | A |
| EXAMPLE 31 | G-A | S1 | 19000 | 5 | BI-A | A1 | MF-A | 50 | 10 | 50 | 5 | T-B | 18 | 23 | A | A |
| COMPARATIVE EXAMPLE 8 | G-A | S1 | 15000 | 5 | BI-A | A1 | MF-A | 50 | 10 | 50 | 5 | T-B | 18 | 23 | A | A |
| EXAMPLE 9 | G-A | S1 | 8000 | 5 | BI-A | A1 | MF-A | 50 | 10 | 50 | 5 | T-B | 18 | 23 | A | A |
| COMPARATIVE EXAMPLE 9 | G-A | S1 | 20000 | 15 | BI-A | A1 | MF-A | 50 | 10 | 50 | 5 | T-B | 18 | 23 | A | A |
| EXAMPLE 32 | G-A | S1 | 20000 | 35 | BI-A | A1 | MF-A | 50 | 10 | 50 | 5 | T-B | 18 | 23 | A | A |
| EXAMPLE 33 | G-A | S1 | 6000 | 50 | BI-A | A1 | MF-A | 50 | 10 | 50 | 5 | T-B | 18 | 23 | A | A |
| COMPARATIVE EXAMPLE 10 | | | | | | | | | | | | | | | | |

VARIOUS PERFORMANCES AT ELONGATED PORTION

| | STATE OF PAINT FILM | | | | | 0T BENT PORTION | | | | | CORROSION RESISTANCE IN SST480h | | | 7 mm-ERICHSEN EXTRUDER PORTION | | CORROSION RESISTANCE IN SST480h | |
|---|---|---|---|---|---|---|---|---|---|---|---|---|---|---|---|---|---|
| | PAINT FILM IN UNWORKED | | AFTER MOLDING 20% THICKNESS- DECREASED PORTION SAICAS (a-2) | | | | PEEL- ING DUE TO IMMER- SION IN BOIL- ING WATER (BLOOM- ING) | | | | | BLIS- TER FROM BENT POR- TION TO PLANE POR- TION | | | | | BLISTER IN VERTEX POR- TION |
| | CONDITION INDENTER INSERTION | | CUT SRENGTH (kN/m) | INTER FACIAL PEEL- ING (%) | CRACK | TAPE PEEL- ING | | | RUST IN VERTEX POR- TION | BLIS- TER IN VERTEX POR- TION | | CRACK | TAPE PEEL- ING | RUST IN VERTEX POR- TION | |
| No. | CONDI- TION (b) (mN) | CONDI- TION (c) (μm · mN) | | | | | | | | | | | | | | |
| EXAMPLE 1 | A | A | 23000 | A1 | A1 | A1 | A1 | A1 | A1 | A1 | A1 | A1 | A1 | A1 | A1 | A1 |
| EXAMPLE 2 | A | A | 25000 | A1 | A1 | A1 | A1 | A1 | A1 | A1 | A1 | A1 | A1 | A1 | A1 | A1 |
| EXAMPLE 3 | A | A | 30000 | A1 | A1 | A1 | A1 | A1 | A1 | A1 | A1 | A1 | A1 | A1 | A1 | A1 |
| EXAMPLE 4 | A | B | 25000 | A1 | A1 | A1 | A1 | A1 | A1 | A1 | A1 | A1 | A1 | B | A1 | A1 |
| COMPARATIVE EXAMPLE 1 | B | B | 8000 | B | B | B | B | B | B | B | B | B | B | B | B | B |
| EXAMPLE 5 | A | A | 20000 | A1 | A1 | A1 | A1 | A1 | A1 | A1 | A1 | A1 | A1 | A1 | A1 | A1 |
| EXAMPLE 6 | B | B | 20000 | B | A1 | A1 | A1 | A1 | A1 | A1 | A1 | A1 | A1 | B | A1 | A1 |
| COMPARATIVE EXAMPLE 3 | A | A | 20000 | A1 | A2 | A2 | A2 | A2 | A2 | A2 | A2 | A2 | A2 | A2 | A2 | A2 |
| EXAMPLE 7 | A | A | 20000 | A1 | A2 | A2 | A2 | A2 | A2 | A2 | A2 | A2 | A2 | A2 | A2 | A2 |
| EXAMPLE 8 | B | B | 20000 | B | A2 | A1 | A1 | A1 | A1 | A1 | A1 | A1 | A1 | A1 | A1 | A1 |
| EXAMPLE 9 | B | B | 20000 | A1 | A2 | A2 | A2 | A2 | A2 | A2 | A2 | A2 | A2 | A2 | A2 | A2 |
| EXAMPLE 10 | A | A | 20000 | A1 | A1 | A1 | A1 | A1 | A1 | A1 | A1 | A1 | A1 | A1 | A1 | A1 |

TABLE 1-1-continued

| | | | | | | | | | | | | |
|---|---|---|---|---|---|---|---|---|---|---|---|---|
| EXAMPLE 11 | A | A | A | A1 | A1 | A1 | A1 | A1 | A1 | A1 | A1 | A1 |
| EXAMPLE 12 | A | A | B | A1 | A1 | A1 | A1 | A1 | A1 | A1 | A1 | A2 |
| EXAMPLE 13 | A | A | B | A1 | A1 | A2 | A2 | A2 | A2 | A2 | A2 | A1 |
| EXAMPLE 14 | A | A | A1 | A2 | A2 | A1 | A1 | A1 | A1 | A1 | A1 | A1 |
| EXAMPLE 15 | B | B | A2 | A1 | A1 | A1 | A1 | A1 | A1 | A1 | A2 | A1 |
| EXAMPLE 16 | A | A | A1 | A1 | A1 | A1 | A1 | A1 | A1 | A1 | A1 | A1 |
| EXAMPLE 17 | A | A | A1 | A2 | A2 | A2 | A2 | A2 | A2 | A2 | A2 | A2 |
| EXAMPLE 18 | A | A | A1 | A1 | A1 | A1 | A1 | A1 | A1 | A1 | A1 | A1 |
| EXAMPLE 19 | A | A | A2 | A2 | A2 | A2 | A2 | A2 | A2 | A2 | A2 | A2 |
| EXAMPLE 20 | B | B | B | B | B | B | B | B | B | B | B | B |
| COMPARATIVE EXAMPLE 4 | B | B | A2 | A1 | A1 | A1 | A1 | A1 | A1 | A1 | A1 | A1 |
| EXAMPLE 21 | A | A | A1 | A1 | A1 | A1 | A1 | A1 | A1 | A1 | A1 | A1 |
| EXAMPLE 22 | A | A | A1 | A2 | A2 | A2 | A2 | A2 | A2 | A2 | A2 | A2 |
| EXAMPLE 23 | A | A | A1 | A1 | A1 | A1 | A1 | A1 | A1 | A1 | A1 | A1 |
| EXAMPLE 24 | A | A | A1 | A1 | A1 | A1 | A1 | A1 | A1 | A1 | A1 | A1 |
| EXAMPLE 25 | A | A | A1 | A2 | A2 | A2 | A2 | A2 | A2 | A2 | A2 | A2 |
| EXAMPLE 26 | A | A | A1 | A1 | A1 | A1 | A1 | A1 | A1 | A1 | A1 | A1 |
| EXAMPLE 27 | A | A | A1 | A1 | A1 | A1 | A1 | A1 | A1 | A1 | A1 | A1 |
| COMPARATIVE EXAMPLE 7 | B | B | B | B | B | B | B | B | B | B | B | B |
| EXAMPLE 28 | A | A | A1 | A1 | A1 | A1 | A1 | A1 | A1 | A1 | A1 | A1 |
| EXAMPLE 29 | A | A | A1 | A1 | A1 | A1 | A1 | A1 | A1 | A1 | A1 | A1 |
| EXAMPLE 30 | A | A | A1 | A1 | A1 | A1 | A1 | A1 | A1 | A1 | A1 | A1 |
| EXAMPLE 31 | A | B | B | B | B | B | B | B | B | B | B | B |
| COMPARATIVE EXAMPLE 8 | B | B | B | B | B | B | B | B | B | B | B | B |
| COMPARATIVE EXAMPLE 9 | B | B | B | B | B | B | B | B | B | B | B | B |
| EXAMPLE 32 | A | A | A1 | A1 | A1 | A1 | A1 | A1 | A1 | A1 | A1 | A1 |
| EXAMPLE 33 | A | A | A1 | A1 | A1 | A1 | A1 | A1 | A1 | A1 | A1 | A1 |
| COMPARATIVE EXAMPLE 10 | B | B | B | B | B | B | B | B | B | B | B | B |

TABLE 1-2

| No. | CONFIGURATION PRE-COATED METAL SHEET ||||||||||||| STATE OF PAINT FILM IN UNWORKED CONDITION ||
|---|---|---|---|---|---|---|---|---|---|---|---|---|---|---|---|
| | BASE SHEET PLATING | CHEMICAL TREATMENT FILM | PRIMER PAINT FILM LAYER |||||||| UPPER PAINT FILM LAYER || TOTAL THICKNESS (μm) | SAICAS (a-1) || INTERFACIAL PEELING (%) |
| | | | POLYESTER-BASED RESIN || CURING AGENT || RATIO OF CURING AGENT ||| PIGMENT CONCENTRATION (PWC) (MASS %) | THICKNESS (μm) | PAINT TYPE | THICKNESS (μm) | | CUT STRENGTH (kN/m) | |
| | | | NUMBER AVERAGE MOLECULAR WEIGHT (Mn) | Tg (°C.) | BI | MF | MF/(BI + MF) (MASS %) | CURING AGENT/(RESIN + CURING AGENT) (MASS %) | | | | | | | |
| EXAMPLE 34 | G-A | S1 | 23000 | 5 | BI-B | MF-A | 50 | 10 | 50 | 5 | T-B | 18 | 23 | A | A |
| EXAMPLE 35 | G-A | S1 | 23000 | 5 | BI-A | MF-B | 50 | 10 | 50 | 5 | T-B | 18 | 23 | A | A |
| EXAMPLE 36 | G-B | S1 | 30000 | 5 | BI-A | MF-A | 50 | 10 | 50 | 5 | T-A | 18 | 23 | A | A |
| EXAMPLE 37 | G-B | S1 | 25000 | 5 | BI-A | MF-A | 50 | 10 | 50 | 5 | T-A | 18 | 23 | A | A |
| EXAMPLE 38 | G-B | S1 | 23000 | 5 | BI-A | MF-A | 50 | 10 | 50 | 5 | T-A | 18 | 23 | A | A |
| EXAMPLE 39 | G-B | S1 | 19000 | 5 | BI-A | MF-A | 50 | 10 | 50 | 5 | T-A | 18 | 23 | A | A |
| COMPARATIVE EXAMPLE 11 | G-B | S1 | 15000 | 5 | BI-A | MF-A | 50 | 10 | 50 | 5 | | | | | |
| COMPARATIVE EXAMPLE 12 | G-B | S1 | 8000 | 5 | BI-A | MF-A | 50 | 10 | 50 | 5 | T-A | 18 | 23 | A | A |
| EXAMPLE 40 | G-B | S1 | 20000 | 15 | BI-A | MF-A | 50 | 10 | 50 | 5 | T-A | 18 | 23 | A | A |
| EXAMPLE 41 | G-B | S1 | 20000 | 35 | BI-A | MF-A | 50 | 10 | 50 | 5 | T-A | 18 | 23 | A | A |
| COMPARATIVE EXAMPLE 13 | G-B | S1 | 6000 | 50 | BI-A | MF-A | 50 | 10 | 50 | 5 | | | | | |
| EXAMPLE 42 | G-B | S1 | 23000 | 5 | BI-B | MF-A | 50 | 10 | 50 | 5 | T-A | 18 | 23 | A | A |
| EXAMPLE 43 | G-B | S1 | 23000 | 5 | BI-A | MF-B | 50 | 10 | 50 | 5 | T-A | 18 | 23 | A | A |
| EXAMPLE 44 | G-C | S1 | 30000 | 5 | BI-A | MF-A | 50 | 10 | 50 | 5 | T-A | 18 | 23 | A | A |
| EXAMPLE 45 | G-C | S1 | 25000 | 5 | BI-A | MF-A | 50 | 10 | 50 | 5 | T-A | 18 | 23 | A | A |
| EXAMPLE 46 | G-C | S1 | 23000 | 5 | BI-A | MF-A | 50 | 10 | 50 | 5 | T-A | 18 | 23 | A | A |
| EXAMPLE 47 | G-C | S1 | 20000 | 5 | BI-A | MF-A | 50 | 10 | 50 | 5 | T-A | 18 | 23 | A | A |
| COMPARATIVE EXAMPLE 14 | G-C | S1 | 15000 | 5 | BI-A | MF-A | 50 | 10 | 50 | 5 | T-A | 18 | 23 | A | A |
| COMPARATIVE EXAMPLE 15 | G-C | S1 | 8000 | 5 | BI-A | MF-A | 50 | 10 | 50 | 5 | T-A | 18 | 23 | A | A |
| EXAMPLE 48 | G-C | S1 | 20000 | 15 | BI-A | MF-A | 50 | 10 | 50 | 5 | T-A | 18 | 23 | A | A |
| EXAMPLE 49 | G-C | S1 | 20000 | 35 | BI-A | MF-A | 50 | 10 | 50 | 5 | T-A | 18 | 23 | A | A |
| COMPARATIVE EXAMPLE 16 | G-C | S1 | 6000 | 50 | BI-A | MF-A | 50 | 10 | 50 | 5 | T-A | 18 | 23 | A | A |
| EXAMPLE 50 | G-C | S1 | 23000 | 5 | BI-B | MF-A | 50 | 10 | 50 | 5 | T-A | 18 | 23 | A | A |
| EXAMPLE 51 | G-C | S1 | 23000 | 5 | BI-A | MF-B | 50 | 10 | 50 | 5 | T-A | 18 | 23 | A | A |
| EXAMPLE 52 | G-D | S1 | 30000 | 5 | BI-A | MF-A | 50 | 10 | 50 | 5 | T-A | 18 | 23 | A | A |
| EXAMPLE 53 | G-D | S1 | 25000 | 5 | BI-A | MF-A | 50 | 10 | 50 | 5 | T-A | 18 | 23 | A | A |
| EXAMPLE 54 | G-D | S1 | 23000 | 5 | BI-A | MF-A | 50 | 10 | 50 | 5 | T-A | 18 | 23 | A | A |

TABLE 1-2-continued

| No. | | | | | | | | | | | |
|---|---|---|---|---|---|---|---|---|---|---|---|
| EXAMPLE 55 | G-D | S1 | 20000 | 5 | BI-A | MF-A | 50 | 10 | 50 | 5 | T-A | 18 | 23 | A | A |
| COMPARATIVE EXAMPLE 17 | G-D | S1 | 15000 | 5 | BI-A | MF-A | 50 | 10 | 50 | 5 | T-A | 18 | 23 | A | A |
| COMPARATIVE EXAMPLE 18 | G-D | S1 | 8000 | 5 | BI-A | MF-A | 50 | 10 | 50 | 5 | T-A | 18 | 23 | A | A |
| EXAMPLE 56 | GD | S1 | 20000 | 15 | BI-A | MF-A | 50 | 10 | 50 | 5 | T-A | 18 | 23 | A | A |
| EXAMPLE 57 | G-D | S1 | 20000 | 35 | BI-A | MF-A | 50 | 10 | 50 | 5 | T-A | 18 | 23 | A | A |
| COMPARATIVE EXAMPLE 19 | G-D | S1 | 6000 | 50 | BI-A | MF-A | 50 | 10 | 50 | 5 | T-A | 18 | 23 | A | A |
| EXAMPLE 58 | G-D | S1 | 23000 | 5 | BI-B | MF-B | 50 | 10 | 50 | 5 | T-A | 18 | 23 | A | A |
| EXAMPLE 59 | G-D | S1 | 23000 | 5 | BI-A | MF-A | 50 | 10 | 50 | 5 | T-A | 18 | 23 | A | A |
| EXAMPLE 60 | G-A | S2 | 30000 | 5 | BI-A | MF-A | 50 | 10 | 50 | 5 | T-A | 18 | 23 | A | A |
| EXAMPLE 61 | G-A | S2 | 25000 | 5 | BI-A | MF-A | 50 | 10 | 50 | 5 | T-A | 18 | 23 | A | A |
| EXAMPLE 62 | G-A | S2 | 23000 | 5 | BI-A | MF-A | 50 | 10 | 50 | 5 | T-A | 18 | 23 | A | A |
| EXAMPLE 63 | G-A | S3 | 30000 | 5 | BI-A | MF-A | 50 | 10 | 50 | 5 | T-A | 18 | 23 | A | A |
| EXAMPLE 64 | G-A | S3 | 25000 | 5 | BI-A | MF-A | 50 | 10 | 50 | 5 | T-A | 18 | 23 | A | A |
| EXAMPLE 65 | G-A | S3 | 23000 | 5 | BI-A | MF-A | 50 | 10 | 50 | 5 | T-A | 18 | 23 | A | A |

VARIOUS PERFORMANCES AT ELOGATED PORTION

| | STATE OF PAINT FILM | | | | | | 0T BENT PORTION | | | | | 7 mm-ERICHSEN EXTRUDER PORTION | | | |
|---|---|---|---|---|---|---|---|---|---|---|---|---|---|---|---|
| | PAINT FILM IN UNWORKED | | STATE OF PAINT FILM AFTER MOLDING 20% THICKNESS-DECREASED PORTION SAICAS (a-2) | | | | | PEEL-ING DUE TO IMMER-SION IN BOIL-ING WATER (BLOOM-ING) | CORROSION RESISTANCE IN SST480h | | | | CORROSION RESISTANCE IN SST480h | | |
| No. | CONDI-TION (b) (mN) | CONDI-TION (c) (μm·mN) | CUT SRENGTH (kN/m) | INTER-FACIAL PEEL-ING (%) | CRACK | TAPE PEEL-ING | | | RUST IN VERTEX POR-TION | BLIS-TER IN VERTEX POR-TION | BLIS-TER FROM BENT POR-TION TO PLANE POR-TION | CRACK | TAPE PEEL-ING | RUST IN VERTEX POR-TION | BLISTER IN VERTEX POR-TION |
| EXAMPLE 34 | A | A | A1 | A1 | A1 | A1 | A1 | A1 | A1 | A1 | A1 | A1 | A1 | A1 | A1 |
| EXAMPLE 35 | B | B | A1 | A2 | A2 | A2 | A2 | A2 | A2 | A2 | A2 | A2 | A2 | A2 | A2 |
| EXAMPLE 36 | A | A | A1 | A1 | A1 | A1 | A1 | A1 | A1 | A1 | A1 | A1 | A1 | A1 | A1 |
| EXAMPLE 37 | A | A | A1 | A1 | A1 | A1 | A1 | A1 | A1 | A1 | A1 | A1 | A1 | A1 | A1 |
| EXAMPLE 38 | A | A | A1 | A1 | A1 | A1 | A1 | A1 | A1 | A1 | A1 | A1 | A1 | A1 | A1 |
| EXAMPLE 39 | B | B | B | A1 | A1 | B | A1 | A1 | A1 | A1 | B | A1 | B | A1 | A1 |
| COMPARATIVE EXAMPLE 11 | B | B | B | A1 | B | B | B | B | B | B | B | B | B | B | B |
| COMPARATIVE EXAMPLE 12 | A | A | A1 | A1 | A1 | A1 | A1 | A1 | A1 | A1 | A1 | A1 | A1 | A1 | A1 |
| EXAMPLE 40 | A | A | A1 | A1 | A1 | A1 | A1 | A1 | A1 | A1 | A1 | A1 | A1 | A1 | A1 |
| EXAMPLE 41 | B | B | B | A1 | B | A1 | A1 | B | B | A1 | A1 | B | B | B | B |
| COMPARATIVE EXAMPLE 13 | A | A | A1 | A1 | A1 | A1 | A1 | A1 | A1 | A1 | A1 | A1 | A1 | A1 | A1 |
| EXAMPLE 42 | A | A | A1 | A1 | A1 | A1 | A1 | A1 | A1 | A1 | A1 | A1 | A1 | A1 | A1 |

TABLE 1-2-continued

| | | | | | | | | | | | | | |
|---|---|---|---|---|---|---|---|---|---|---|---|---|---|
| EXAMPLE 43 | B | B | A1 | A2 | A2 | A2 | A2 | A2 | A2 | A2 | A2 | A2 | A2 |
| EXAMPLE 44 | A | A | A1 | A1 | A1 | A1 | A1 | A1 | A1 | A1 | A1 | A1 | A1 |
| EXAMPLE 45 | A | A | A1 | A1 | A1 | A1 | A1 | A1 | A1 | A1 | A1 | A1 | A1 |
| EXAMPLE 46 | A | A | A1 | A1 | A1 | A1 | A1 | A1 | A1 | A | A | A | A1 |
| EXAMPLE 47 | B | B | B | B | B | B | B | B | B | B | B | B | B |
| COMPARATIVE EXAMPLE 14 | B | B | B | B | B | B | B | B | B | B | B | B | B |
| COMPARATIVE EXAMPLE 15 | A | A | A1 | A1 | A1 | A1 | A1 | A1 | A1 | A1 | A1 | A1 | A1 |
| EXAMPLE 48 | A | A | A1 | A1 | A1 | A1 | A1 | A1 | A1 | A1 | A1 | A1 | A1 |
| EXAMPLE 49 | B | B | B | B | B | B | B | B | B | B | B | B | B |
| COMPARATIVE EXAMPLE 16 | A | A | A1 | A1 | A1 | A1 | A1 | A1 | A1 | A1 | A1 | A1 | A1 |
| EXAMPLE 50 | B | B | A2 | A2 | A2 | A2 | A2 | A2 | A2 | A2 | A2 | A2 | A2 |
| EXAMPLE 51 | A | A | A1 | A1 | A1 | A1 | A1 | A1 | A1 | A1 | A1 | A1 | A1 |
| EXAMPLE 52 | A | A | A1 | A1 | A1 | A1 | A1 | A1 | A1 | A1 | A1 | A1 | A1 |
| EXAMPLE 53 | A | A | A1 | A1 | A1 | A1 | A1 | A1 | A1 | A1 | A1 | A1 | A1 |
| EXAMPLE 54 | A | A | A1 | A1 | A1 | A1 | A | A | A | A | A | A | A |
| EXAMPLE 55 | B | B | A1 | A1 | A1 | A1 | A1 | A1 | B | B | B | B | B |
| COMPARATIVE EXAMPLE 17 | B | B | B | B | B | B | B | B | B | B | B | B | B |
| EXAMPLE 56 | A | A | A1 | A1 | A1 | A1 | A1 | A1 | A1 | A1 | A1 | A1 | A1 |
| EXAMPLE 57 | B | B | B | B | B | B | B | B | B | B | B | B | B |
| COMPARATIVE EXAMPLE 18 | B | B | B | B | B | B | B | B | B | B | B | B | B |
| EXAMPLE 58 | A | A | A1 | A1 | A1 | A1 | A | A | A | A | A | A | A |
| EXAMPLE 59 | B | B | A2 | A2 | A2 | A2 | A2 | A2 | A2 | A2 | A2 | A2 | A2 |
| EXAMPLE 60 | A | A | A1 | A1 | A1 | A1 | A1 | A1 | A1 | A1 | A1 | A1 | A1 |
| EXAMPLE 61 | A | A | A1 | A1 | A1 | A1 | A1 | A1 | A1 | A1 | A1 | A1 | A1 |
| EXAMPLE 62 | A | A | A1 | A1 | A1 | A1 | A1 | A1 | A1 | A1 | A1 | A1 | A1 |
| EXAMPLE 63 | A | A | A1 | A1 | A1 | A1 | A1 | A1 | A1 | A1 | A1 | A1 | A1 |
| EXAMPLE 64 | A | A | A1 | A1 | A1 | A1 | A1 | A1 | A | A | A | A | A |
| EXAMPLE 65 | A | A | A1 | A1 | A1 | A1 | A1 | A1 | A1 | A1 | A1 | A1 | A1 |

In each of the examples, the paint film physical properties based on the method of inserting the microhardness measuring quadrangular pyramid-shaped indenter, and the cut strength and the peel form of the elongated portion of the molded product by SAICAS satisfied the criteria, and thus the occurrence of problems at elongated portion such as the cracks and the peeling of the paint film, the paint film peeling (blooming) due to the immersion in boiling water, and poor corrosion resistance in the SST in the 0T bent portion, and the cracks and the peeling of the paint film, and poor corrosion resistance in the SST in the 7 mm-Erichsen worked portion was not observed.

On the other hand, in each of the comparative examples, the paint film physical properties based on the method of inserting the microhardness measuring quadrangular pyramid-shaped indenter, and the cut strength and the peel form of the elongated portion of the molded product by SAICAS did not satisfy the criteria, and thus the occurrence of problems at elongated portion as described above was observed.

Test Example 2

Hereinbelow, further verifications were conducted by focusing on the number of substituents capable of reacting with OH groups in the polyester-based resin in the blocked isocyanate resin and the number of OH groups in the polyester-based resin.

(1. Plated Steel Sheet Used as Base Sheet)

Out of the base sheets used in the test example 1, the following was used.

G-A: Zn-11% Al-3% Mg-0.2% Si Hot-Dip Zinc Alloy Plated Steel Sheet (Sheet Thickness 0.60 mm, Plating Weight 40 g/m$^2$)

(2. Film Formation of Chemical Treatment Film Layer)

Out of the painting components intended for forming the chemical treatment film layer used in the test example 1, the following was used.

S1: Water-Based Painting Component Composed of Tannic Acid, Silane Coupling Agent, Fine Silica Particles, and Polyester Resin (3-1. Film Formation of Primer Paint Film Layer)

As a painting component intended for forming the primer paint film, there were prepared primer paints obtained by variously changing the types and compounding ratios of the polyester-based resin, the curing agent, and the rust preventive pigment, as described in Table 2.

<Polyester-Based Resin>

Pes-A: Polyester resin (number of OH in molecule: 2.0)
Pes-B: Polyester resin (number of OH in molecule: 3.5)
Pes-C: Polyester resin (number of OH in molecule: 5.0)

Each of these resins has a number average molecular weight of 23000 and Tg of 5° C.

<Curing Agent>

BI-C: MEK oxime blocked hydrogenated XDI resin (number of NCO in molecule: 2.5)
BI-D: MEK oxime blocked hydrogenated XDI resin (number of NCO in molecule: 3.0)
BI-E: MEK oxime blocked hydrogenated XDI resin (number of NCO in molecule: 3.5)

Each of these curing agents uses hydrogenated xylene diisocyanate as a raw material, and has a number average molecular weight of 1500 to 2000.

As the melamine derivative, the following was used out of those used in the test example 1.

MF-A: Methylated melamine

<Rust Preventive Pigment>

A compounded product of equal mass of calcium ion-exchanged silica and aluminum tripolyphosphate, same as that used in the test example 1 was used.

The primer paints having the components as described in Table 2 below were used and bar-coated on the plated steel sheets after being subjected to the above-described chemical treatment so as to have a thickness when dried as described in Table 2, and then dried in an air-heating furnace at a metal surface reached temperature of 215° C.

(3-2. Film Formation of Upper Paint Film Layer)

As a painting component intended for forming the upper paint film layer, the following was used out of those used in the test example 1.

T-A: High-molecular polyester/melamine resin curing system composition (FLC7000 manufactured by Nippon Paint Co., Ltd.)

The above-described T-A was bar-coated on the layer having the above-described primer paint film formed thereon, so as to have a total thickness when dried as described in Table 2, and then dried in an air-heating furnace at a metal surface reached temperature of 230° C.

(4-1. State of Paint Film in Unworked Condition)

The state of the paint film of each of the pre-coated plated steel sheets manufactured by the above-described method was checked by SAICAS and indenter insertion, in a manner same as that of the above-described test example 1. Note that the evaluation method and the evaluation criteria are the same as those of the above-described test example 1, and thus detailed explanation thereof will be omitted below.

(5. Performance Evaluation)

The performance at the elongated portion of each of the pre-coated plated steel sheets manufactured by the above-described method was evaluated in a manner same as that of the above-described test example 1. Note that the evaluation method and the evaluation criteria are the same as those of the above-described test example 1, and thus detailed explanation thereof will be omitted below.

The obtained results are collectively described in Table 2 below.

TABLE 2

| | | | | | CONFIGURATION PRE-COATED METAL SHEET | | | | | | | | | | STATE OF PAINT FILM IN UNWORKED CONDITION | |
|---|---|---|---|---|---|---|---|---|---|---|---|---|---|---|---|---|
| | | | | | PRIMER PAINT FILM LAYER | | | | | | | | UPPER PAINT FILM LAYER | | SAICAS (a-1) | |
| | | | POLYESTER-BASED RESIN | | | CURING AGENT | | | | RATIO OF CURING AGENT CURING AGENT/ (RESIN + CURING AGENT) (MASS %) | PIG-MENT CON-CEN-TRA-TION (PWC) (MASS %) | THICK-NESS (μm) | | | | |
| No. | BASE SHEET PLAT-ING | CHEM-ICAL TREAT-MENT FILM | PES | NUM-BER OF CH (nb) | BI | NUMBER OF NCO (na) | MF | MF/ (BI + MF) | na + nb | | | | PAINT TYPE | THICK-NESS (μm) | TOTAL THICK-NESS (μm) | CUT STRENGTH (kN/m) | INTER-FACIAL PEEL-ING (%) |
| EX-AMPLE A | G-A | S1 | Pes-A | 2.0 | BI-C | 2.5 | MF-A | 20 | 4.5 | 10 | 50 | 5 | T-A | 18 | 23 | A2 | A |
| EX-AMPLE B | G-A | S1 | Pes-A | 2.0 | BI-D | 3.0 | MF-A | 20 | 5.0 | 10 | 50 | 5 | T-A | 18 | 23 | A2 | A |
| EX-AMPLE C | G-A | S1 | Pes-A | 2.0 | BI-E | 3.5 | MF-A | 20 | 5.5 | 10 | 50 | 5 | T-A | 18 | 23 | A | A |
| EX-AMPLE D | G-A | S1 | Pes-B | 3.5 | BI-C | 2.5 | MF-A | 20 | 6.0 | 10 | 50 | 5 | T-A | 18 | 23 | A | A |
| EX-AMPLE E | G-A | S1 | Pes-B | 3.5 | BI-D | 3.0 | MF-A | 20 | 6.5 | 10 | 50 | 5 | T-A | 18 | 23 | A | A |
| EX-AMPLE F | G-A | S1 | Pes-B | 3.5 | BI-E | 3.5 | MF-A | 20 | 7.0 | 10 | 50 | 5 | T-A | 18 | 23 | A | A |
| EX-AMPLE G | G-A | S1 | Pes-C | 5.0 | BI-C | 2.5 | MF-A | 20 | 7.5 | 10 | 50 | 5 | T-A | 18 | 23 | A | A |
| EX-AMPLE H | G-A | S1 | Pes-C | 5.0 | BI-D | 3.0 | MF-A | 20 | 8.0 | 10 | 50 | 5 | T-A | 18 | 23 | A | A |
| EX-AMPLE I | G-A | S1 | Pes-C | 5.0 | BI-E | 3.5 | MF-A | 20 | 8.5 | 10 | 50 | 5 | T-A | 18 | 23 | A | A |

TABLE 2-continued

| | STATE OF PAIN FILM IN UNWORKED CONDITION | | STATE OF PAINT FILM AFTER MOLDING 20% THICKNESS-DECREASED PORTION SAICAS (a-2) | | VARIOUS PERFORMANCES AT ELONGATED PORTION | | | | | | | | | |
|---|---|---|---|---|---|---|---|---|---|---|---|---|---|---|
| | IDENTER INSERTION | | | | 0T BENT PORTION | | | | | | 7 mm-ERICHSEN EXTRUDED PORTION | | | |
| | | | | | | | PEELING DUE TO IMMERSION IN BOILING WATER (BLOOMING) | CORROSION RESISTANCE IN SST480h | | | | | CORROSION RESISTANCE IN SST480h | |
| | CONDITION (b) (mN) | CONDITION (c) (μm·mN) | CUT STRENGTH (kN/m) | INTERFACIAL PEELING (%) | CRACK | TAPE PEELING | | RUST | BLISTER IN VERTEX PORTION | BLISTER FROM BENT PORTION TO PLANE PORTION | CRACK | TAPE PEELING | RUST IN VERTEX PORTION | BLISTER IN VERTEX PORTION |
| EXAMPLE A | A | A | A2 | A1 | A1 | A2 | A1 | A2 | A2 | A2 | A1 | A2 | A2 | A2 |
| EXAMPLE B | A | A | A2 | A1 | A1 | A2 | A1 | A2 | A2 | A2 | A1 | A2 | A2 | A2 |
| EXAMPLE C | A | A | A2 | A1 | A1 | A2 | A1 | A1 | A1 | A1 | A1 | A1 | A1 | A1 |
| EXAMPLE D | A | A | A1 | A1 | A1 | A1 | A1 | A1 | A1 | A1 | A1 | A1 | A1 | A1 |
| EXAMPLE E | A | A | A1 | A1 | A1 | A1 | A1 | A1 | A1 | A1 | A1 | A1 | A1 | A1 |
| EXAMPLE F | A | A | A1 | A1 | A1 | A1 | A1 | A1 | A1 | A1 | A1 | A1 | A1 | A1 |
| EXAMPLE G | A | A | A1 | A1 | A1 | A1 | A1 | A1 | A1 | A1 | A1 | A1 | A1 | A1 |
| EXAMPLE H | A | A | A1 | A1 | A1 | A1 | A1 | A1 | A1 | A1 | A1 | A1 | A1 | A1 |
| EXAMPLE I | B | B | A2 | A2 | A2 | A1 | A2 | A2 | A2 | A2 | A2 | A2 | A2 | A2 |

In each of the examples C to H, the value of na+nb was within a range of 5.5 to 8.0, namely, the resin that had low Tg and high molecular weight and spread well, was in a state of being hardened with sufficient cross-link density, and besides, the paint film was one capable of dispersing the stress caused by the deformation thereof, so that the paint film physical properties based on the method of inserting the microhardness measuring quadrangular pyramid-shaped indenter, and the cut strength and the peel form of the elongated portion of the molded product by SAICAS satisfied the criteria, and thus the occurrence of problems at elongated portion such as the cracks and the peeling of the paint film, the paint film peeling (blooming) due to the immersion in boiling water, and poor corrosion resistance in the SST in the 0T bent portion, and the cracks and the peeling of the paint film, and poor corrosion resistance in the SST in the 7 mm-Erichsen worked portion was not observed.

On the other hand, in each of the examples A and B, the value of na+nb was lower than 5.5 and the cross-linking did not proceed much, and thus although the cracks in the paint film due to working were suppressed, the cohesive force of the paint film was low, and the cut strength by SAICAS was slightly low, resulting in that the tape peeling in the worked portion was likely to occur, and the corrosion resistance had a tendency to decrease. Further, in the example I, the value of na+nb exceeded 8.0 and the cross-linking proceeded to a rather great extent, so that cracks in the paint film due to working had a tendency to increase. Consequently, in these examples, it was confirmed that the corrosion resistance in the worked portion also had a tendency to decrease. Further, the stress due to the indenter insertion was slightly large and the residual stress of the paint film during working became high, and thus it was confirmed that there was a tendency that the problems at elongated portion such as blooming were also difficult to be suppressed.

The preferred embodiments of the present invention have been described in detail above with reference to the attached drawings, but the present invention is not limited to such examples. It is apparent that a person having common knowledge in the technical field to which the present invention belongs is able to devise various variation or modification examples within the range of technical ideas described in the claims, and it should be understood that such examples belong to the technical scope of the present invention as a matter of course.

EXPLANATION OF CODES

10 Zn—Al—Mg-based alloy plated steel sheet
20 pre-coated plated steel sheet
30 molded product
101 steel sheet
103, 201 Zn—Al—Mg-based alloy plating layer
203 chemical treatment film layer
205 paint film layer

What is claimed is:
1. A pre-coated plated steel sheet, comprising:
a plating layer composed of Zn—Al—Mg-based alloy plating, the plating layer positioned on one side or both sides of a steel sheet;
a chemical treatment film layer positioned on the plating layer; and
a paint film layer positioned on the chemical treatment film, wherein:
the paint film layer includes a primer paint film layer, and an upper paint film layer positioned on the primer paint film layer; and
out of conditions below, at least any of the following is satisfied: both a condition (a-1) and a condition (a-2); a condition (b); and a condition (c),
(a-1) a cut strength measured by cutting an interface between the paint film layer and a layer positioned on the steel sheet side relative to the paint film layer by a SAICAS method is 1.00 KN/m or more on average, 5% or less of a cut area is in the form of interfacial peeling, and the remaining cut area is in the form of cohesive failure within the paint film layer,
(a-2) a cut strength of a portion measured by cutting an interface between the paint film layer and a layer positioned on the steel sheet side relative to the paint film layer by a SAICAS method is 1.00 KN/m or more on average, 20% or less of a cut area is in the form of interfacial peeling, and the remaining cut area is in the form of cohesive failure within the paint film layer, wherein the portion is where a thickness of the pre-coated plated steel sheet after being subjected to uniaxial elongation has decreased by 20% or more when compared to a thickness of a non-molded portion,
(b) an indentation load when a microhardness measuring quadrangular pyramid-shaped indenter is inserted at a rate of 2 μm per minute with respect to a position 1 μm away in a direction of the primer paint film layer from an interface between the primer paint film layer and a layer positioned on the steel sheet side relative to the primer paint film layer, at a cross section obtained by cutting the primer paint film layer in a thickness direction, and the indenter reaches a depth of 10 μm, is less than 1000 mN,
(c) a load curve with respect to a displacement when a microhardness measuring quadrangular pyramid-shaped indenter is inserted at a rate of 10 μm per second to a depth of 10 μm with respect to a position 1 μm away in a direction of the primer paint film layer from an interface between the primer paint film layer and a layer positioned on the steel sheet side relative to the primer paint film layer, at a cross section obtained by cutting the primer paint film layer in the thickness direction, and then the indenter is unloaded at a rate of 2 μm per minute is drawn, and at a plane defined by the displacement and the load, an area of a range surrounded by a straight line corresponding to the displacement of 10 μm, a straight line corresponding to the load of 0, and the load curve when performing the unloading is less than 500 μm·mN.

2. The pre-coated plated steel sheet according to claim 1, wherein:
the plating layer contains aluminum of 0.5 mass % or more and 60.0 mass % or less, magnesium of 0.5 mass % or more and 15.0 mass % or less, and the balance composed of zinc and impurities;
a thickness of the primer paint film layer is 2 to 10 μm;
a total thickness of the primer paint film layer and the upper paint film layer is 10 to 30 μm; and
the primer paint film layer contains a polyester-based resin having an average molecular weight of 19000 or more and a glass transition point Tg of less than 40° C., and a curing agent, wherein
the curing agent contains blocked isocyanate or blocked isocyanate resin.

3. The pre-coated plated steel sheet according to claim 2, wherein
a content of the curing agent with respect to a total content of the polyester-based resin and the curing agent is 5 to 15% in terms of mass %.

4. The pre-coated plated steel sheet according to claim 2, wherein
the curing agent further contains melamine or melamine derivative.

5. The pre-coated plated steel sheet according to claim 4, wherein
a content of the melamine or melamine derivative with respect to a total content of the blocked isocyanate or blocked isocyanate resin and the melamine or melamine derivative is 20 to 50% in terms of mass %.

6. The pre-coated plated steel sheet according to claim 2, wherein
the average molecular weight of the polyester-based resin is 23000 to 25000.

7. The pre-coated plated steel sheet according to claim 2, wherein
the glass transition point Tg of the polyester-based resin is 0 to 20° C.

8. The pre-coated plated steel sheet according to claim 2, wherein
when the number of substituents capable of reacting with OH groups in the polyester-based resin, in the blocked isocyanate or blocked isocyanate resin, is described as na, and the number of OH groups in the polyester-based resin is described as nb, the sum (na+nb) is 5.5 or more and 8.0 or less.

9. The pre-coated plated steel sheet according to claim 2, wherein
the plating layer is composed of Zn-11% Al-3% Mg-0.2% Si alloy plating, wherein the Si is in place of a part of Zn in the balance.

10. A molded product comprising the pre-coated plated steel sheet according to claim 1,
wherein
at the portion where a thickness of the plated steel sheet in the molded product has decreased by 20% or more when compared to a thickness of a non-molded portion, the cut strength measured by cutting the interface between the paint film layer and the layer positioned on the steel sheet side relative to the paint film layer by the SAICAS method is 1.00 KN/m or more on average, 20% or less of a cut area is in the form of interfacial peeling, and the remaining cut area is in the form of cohesive failure within the paint film layer.

11. The molded product according to claim 10, wherein
the plating layer in the molded product contains aluminum of 5 mass % or more and 15 mass % or less, and magnesium of 2 mass % or more and 4 mass % or less.

12. A pre-coated plated steel sheet, comprising:
a plating layer comprising Zn—Al—Mg-based alloy plating, the plating layer positioned on one side or both sides of a steel sheet;
a chemical treatment film layer positioned on the plating layer; and
a paint film layer positioned on the chemical treatment film, wherein:
the paint film layer includes a primer paint film layer, and an upper paint film layer positioned on the primer paint film layer; and
out of conditions below, at least any of the following is satisfied: both a condition (a-1) and a condition (a-2); a condition (b); and a condition (c), (a-1) a cut strength measured by cutting an interface between the paint film layer and a layer positioned on the steel sheet side relative to the paint film layer by a SAICAS method is 1.00 KN/m or more on average, 5% or less of a cut area is in the form of interfacial peeling, and the remaining cut area is in the form of cohesive failure within the paint film layer, (a-2) a cut strength of a portion measured by cutting an interface between the paint film layer and a layer positioned on the steel sheet side relative to the paint film layer by a SAICAS method is 1.00 KN/m or more on average, 20% or less of a cut area is in the form of interfacial peeling, and the remaining cut area is in the form of cohesive failure within the paint film layer, wherein the portion is where a thickness of the pre-coated plated steel sheet after being subjected to uniaxial elongation has decreased by 20% or more when compared to a thickness of a non-molded portion, (b) an indentation load when a microhardness measuring quadrangular pyramid-shaped indenter is inserted at a rate of 2 μm per minute with respect to a position 1 μm away in a direction of the primer paint film layer from an interface between the primer paint film layer and a layer positioned on the steel sheet side relative to the primer paint film layer, at a cross section obtained by cutting the primer paint film layer in a thickness direction, and the indenter reaches a depth of 10 μm, is less than 1000 mN, (c) a load curve with respect to a displacement when a microhardness measuring quadrangular pyramid-shaped indenter is inserted at a rate of 10 μm per second to a depth of 10 μm with respect to a position 1 μm away in a direction of the primer paint film layer from an interface between the primer paint film layer and a layer positioned on the steel sheet side relative to the primer paint film layer, at a cross section obtained by cutting the primer paint film layer in the thickness direction, and then the indenter is unloaded at a rate of 2 μm per minute is drawn, and at a plane defined by the displacement and the load, an area of a range surrounded by a straight line corresponding to the displacement of 10 μm, a straight line corresponding to the load of 0, and the load curve when performing the unloading is less than 500 μm·mN.

13. A molded product comprising the pre-coated plated steel sheet according to claim 12,
wherein
at the portion where the thickness of a plated steel sheet in the molded product has decreased by 20% or more when compared to a thickness of a non-molded portion, the cut strength measured by cutting the interface between the paint film layer and the layer positioned on the steel sheet side relative to the paint film layer by the SAICAS method is 1.00 KN/m or more on average, 20% or less of a cut area is in the form of interfacial peeling, and the remaining cut area is in the form of cohesive failure within the paint film layer.

* * * * *